United States Patent
Bakx et al.

(10) Patent No.: US 7,903,517 B2
(45) Date of Patent: Mar. 8, 2011

(54) OPTICAL DISK DRIVE WITH DISK TYPE DETERMINATION AND METHOD OF DETERMINING A DISK TYPE OF AN OPTICAL DISK WITH AN OPTICAL DISK DRIVE

(75) Inventors: Johannes Leopoldus Bakx, Eindhoven (NL); Maarten Kuijper, Eindhoven (NL); Johannes Franciscus Petrus Claas, Eindhoven (NL); Petrus Antonius Verbeek, Eindhoven (NL)

(73) Assignee: Lite-On It Corporation, Taipei (TW)

( * ) Notice: Subject to any disclaimer, the term of this patent is extended or adjusted under 35 U.S.C. 154(b) by 506 days.

(21) Appl. No.: 12/099,300

(22) Filed: Apr. 8, 2008

(65) Prior Publication Data
US 2009/0252010 A1    Oct. 8, 2009

(51) Int. Cl.
*G11B 7/00* (2006.01)
(52) U.S. Cl. .......... 369/53.23; 369/53.2; 369/53.22; 369/44.27
(58) Field of Classification Search .......... 369/53.2, 369/53.22, 53.23, 44.27
See application file for complete search history.

(56) References Cited

U.S. PATENT DOCUMENTS

| 5,627,808 | A * | 5/1997 | Hajjar et al. | 369/44.32 |
|---|---|---|---|---|
| 6,272,087 | B1 * | 8/2001 | Hirashima | 369/53.22 |
| 6,285,635 | B1 * | 9/2001 | Watanabe et al. | 369/44.27 |
| 6,816,443 | B1 * | 11/2004 | Hwang | 369/44.32 |
| 7,302,588 | B2 * | 11/2007 | Sako et al. | 713/193 |
| 7,362,681 | B2 * | 4/2008 | Tawaragi | 369/53.23 |
| 7,391,692 | B2 * | 6/2008 | Matsumoto | 369/53.22 |
| 7,561,503 | B2 * | 7/2009 | Moriwaki | 369/47.15 |
| 7,570,561 | B2 * | 8/2009 | Tai | 369/53.23 |
| 7,596,068 | B2 * | 9/2009 | Lee | 369/53.23 |
| 7,626,907 | B2 * | 12/2009 | Chang et al. | 369/53.22 |
| 7,724,615 | B2 * | 5/2010 | Sun et al. | 369/44.13 |
| 2002/0136108 | A1 * | 9/2002 | Kadlec et al. | 369/44.28 |
| 2004/0218497 | A1 * | 11/2004 | Choi et al. | 369/53.23 |
| 2007/0140074 | A1 * | 6/2007 | Nunez et al. | 369/44.13 |
| 2008/0080332 | A1 * | 4/2008 | Chuang et al. | 369/44.13 |
| 2009/0109806 | A1 * | 4/2009 | Chiu et al. | 369/44.13 |
| 2009/0147645 | A1 * | 6/2009 | Nakamura et al. | 369/53.35 |

FOREIGN PATENT DOCUMENTS

JP    2004110901 A  *  4/2004
JP    2006179138 A  *  7/2006

* cited by examiner

*Primary Examiner* — Wayne R Young
*Assistant Examiner* — Brenda Bernardi
(74) *Attorney, Agent, or Firm* — Thomas, Kayden, Horstemeyer & Risley, LLP

(57) ABSTRACT

An optical disk drive and a method for determining a disk type are described. The optical disk drive may be arranged to receive a radial error signal while an incident beam is focused onto the optical disk and before tracking the track, to analyze the radial error signal for detecting whether a wobble signal is present, indicating whether the track is wobbled, and to derive a disk type from the wobble signal, if present. The optical disk drive may additionally or alternatively be arranged to receive a central aperture signal while the incident beam is focused onto the optical disk and before tracking a track including a sequence of embossed pits, to analyze the signal amplitude of the central aperture signal, and to determine the disk type from at least a first variation of the signal amplitude of the central aperture signal as a function of time.

13 Claims, 15 Drawing Sheets

OPTICAL DISK DRIVE WITH DISK TYPE DETERMINATION AND METHOD OF DETERMINING A DISK TYPE OF AN OPTICAL DISK WITH AN OPTICAL DISK DRIVE

FIELD

The invention relates to an optical disk drive for determining a disk type of an optical disk comprising a substantially circular track. The invention further relates to a method for determining a disk type of an optical disk comprising a substantially circular track for use with an optical disk drive.

BACKGROUND

In optical disk drives the first action after inserting a disk is disk recognition. Disk recognition is used to determine to which disk family the inserted disk belongs and to determine the specific disk type within the family. Disk families are Compact Disk (CD) with a 1.2 mm substrate, Digital Versatile Disk (DVD) and High-Definition DVD (HDDVD) with a 0.6 mm substrates and Blu-Ray disk (BD) with a 0.1 mm cover layer through which the disk is readout. Each family is associated with a variety of standards for a plurality of disk types, associated with e.g. the physical and logical format of the disks, and with operating conditions, such as the laser wavelength and numerical aperture (NA) of the objective lens with which the disk can be read and/or write the disk, and e.g. the tracking method associated with the disk type. The standards for CD specify a NA of 0.45-0.52 and an infrared laser (with a wavelength of typically 780 nm), the standards for DVD specify a NA of 0.60 and a red laser (630-690 nm), the standards for HDDVD specify a NA of 0.67 and a blue laser (typically 405 nm) and the BD standards specify a NA of 0.85 and also a blue laser (typically 405 nm).

The plurality of disk types within a family typically include one or more read-only types (ROM) associated with a track comprising embossed pits, one or more one-time recordable types (R) associated with one-time writable, generally non-erasable, marks in a recording material, e.g. a dye layer, in an empty track and one or more re-recordable or rewritable (RE, RW, RAM) types associated with writable and erasable marks in typically a phase-change material in an empty track. E.g., the CD family comprises CD-ROM (including CD-Audio), CD-R and CD-RW, the DVD-family comprises DVD-ROM, DVD+R, DVD-R, DVD+RW, DVD-RW, DVD-RAM, DVD-R-QFlix (a different type of DVD-R disks), the HDDVD-family comprises HDDVD-ROM, HDDVD-R, HDDVD-RW, HDDVD-RAM and the BD-family comprises BD-ROM, BD-R and BD-RE. One may note that especially for the 0.6 mm family quite a large amount of disk types exists. On top of the listed types, many disk types also exist in dual layer (and even triple layer) derivates which must also be recognized.

In general, a recordable (like R/RW/RAM types) disk has a low reflection and contains a wobbled groove. The groove generates the Push Pull (PP) tracking signal from the empty disk (as well as from recorded parts), while the high frequent wobble is decoded with addressing information. The recorded part of the recordable disk might in some cases also generate a Differential Phase Detection (DPD) tracking signal from the recorded marks. In general, a ROM disk has high reflection and only contains a spiral of embossed pits. Beside a DPD tracking signal, sometimes also a Push Pull signal is generated. It is therefore not an easy task to reliably determine the disk type by current methods based on reflection and DPD signal level.

In prior art optical drives the tracking method is determined by selecting one of the two tracking methods prior to the situation where the actual disk type has been positively identified. If the chosen tracking method results in a "tracking ok", the system is in radial tracking mode and the system can try to read out data from the wobble. If it is possible to read out data, the inserted disk is assumed to be a recordable one, the PP tracking method has to be chosen for further operation of the disk. If the selected one was DPD the system needs to switch to PP. Each time the tracking method changes, the new tracking mode has to be initialised. To read the wobble data, also the correct wobble path has to be initialised. This trial-end-error method is not always robust enough and retries are necessary.

For some disk types, the disk is prepared with a disk recognition area allowing to recognize e.g. a blue-laser family disk with a red-laser. E.g., for HDDVD disks a so-called system lead-in area is specified at the inner disk zone. Though this area is readable by red laser, it may be hard to locate this area in a low-cost drive without accurate sledge control, as the system lead-in area is a very narrow band which may be hard to find. Especially when a drive design is used without a calibrated radial home position, it can not be guaranteed that an attempted jump into the system lead-in area for HDDVD actually reaches that area. When attempting to recognize a HDDVD disk, prior art optical disk drives thus generally use a trial-and-error method attempting to read the disk with the red laser and the blue laser in turn, and recognizing the disk with one of the lasers.

SUMMARY

The present invention aims to provide an optical disk drive and method for use with an optical disk drive for determining a disk type in a robust and efficient manner. In particular, for discriminating recordable disks from ROM formats and further discriminating between the different types of recordable disks and between the different types of ROM disks. The invention aims to reduce the number of trial-and-error operations with the selection of tracking method and laser color, and aims to provide a positive disk type identification.

Hereto the optical disk drive according to the present invention comprises:
- an optical source for generating an incident beam,
- an optical arrangement for focusing the incident beam into a spot on the optical disk, for positioning the spot at a radial position along the disk and for tracking the track,
- a sensor for sensing a reflected beam produced by the optical disk upon receiving the incident beam, and for producing a sensor output signal comprising a radial error signal, and
- a signal analyzer arranged to:
    receive the radial error signal while the incident beam is focused onto said optical disk and before tracking the track,
    analyze the radial error signal for detecting whether a wobble signal is present, indicating whether the track is wobbled, and
    derive a disk type indicator from the wobble signal, if present, indicating whether the optical disk is one of a group of disk types.

The radial error signal may e.g. be the radial push-pull signal. In prior art disk drives and methods, the wobble signal is detected and analyzed when the incident beam is tracking the track. In the disk drive according to the invention, the presence or absence of wobble signal is detected without tracking the track. Hence, no tracking method, push-pull or DPD tracking, needs to be selected for deriving the disk type indicator. As a result, there is no time lost on a trial-and-error operation with either tracking mode.

When the wobble signal is present, the disk type indicator may indicate that the optical disk is a disk of the group of one-time recordable and rewritable types, i.e. a disk with a wobbled groove. The disk type indicator may be more specific, indicating, based on the wobble signal, that the disk is of the DVD-minus group, i.e. a DVD-R or a DVD-RW type (which have similar wobble signals). The disk type indicator may indicate a specific type, e.g. a DVD-R-Qflix type, which has a unique wobble frequency.

In deriving the disk type indicator, the signal analyzer may use additional characteristics from the disk, e.g. a measured substrate thickness indicating the disk family (CD, DVD or HDDVD, BD), or a detected number of layers.

The disk type indicator may also take a value "yet-unknown" indicating that the disk type is not yet recognized and flagging that a further disk type recognition is needed. E.g., when no wobble signal is detected, the disk type indicator may take the value "yet-unknown" and a further recognition may be done to check e.g. whether the disk is of a ROM type.

The disk type indicator may also take a value "not supported" indicating that the disk type is not supported by the disk drive and e.g. forcing ejecting the disk from the drive and signaling a user or a hosting device such as a video recorder or a computer.

Preferably, the method is performed after determining the substrate thickness, which may be performed e.g. by using a sweep in a direction perpendicular to the disk with the optical arrangement for detecting the presence and position of interfaces and layers from a focus error signal generated when the incident beam crosses an interface or layer in the optical disk. When thus determining e.g. that the disk has a 0.6 mm substrate, the R/RW/RAM disk types of the DVD and HDDVD families can largely be recognized based on a wobble signal with only the focusing servo closed, but radial servo method still undetermined, so open loop.

The method may be performed, independent of the disk family and disk type, with a pre-selected laser color. E.g., the blue laser may be to discriminate the R/RW/RAM disk types for the 0.6 mm substrate family, for both HDDVD and DVD. This omits the need for a trial-and-error method of trying one laser color first, and trying another laser color next when detection with the first laser color failed.

Once the R/RW/RAM disk type is successfully determined, the drive may select the proper tracking method and closes the radial tracking loop. By reading out the disk information as stored on the disk, e.g. stored in the ADIP information or in a lead-in area, the HDDVD/DVD R/RW/RAM disk recognition may be completed. I.e., a final discrimination between disk types with the same wobble characteristics, e.g. with the same wobble frequency such as the DVD-R and DVD-RW types, may be performed by reading from the disk whether the disk is actually either a DVD-R or a DVD-RW type.

In an embodiment, the signal analyzer is arranged to, upon detecting the presence of the wobble signal:
  determine a frequency characteristic of the wobble signal,
  classify the optical disk in dependence on the frequency characteristic.

The frequency characteristic may be the wobble frequency. The frequency characteristic may additionally or alternatively comprise the absence of a frequency component within a pre-determined range of the wobble signal, or the presence of such frequency component.

In the disk recognition, after focusing the laser to the disk, the system is in a radial open loop mode. The wobble signal is an open loop tracking signal with a superposed signal having the the wobble frequency. Using e.g. a band pass filter, the wobble frequency signal can be filtered out. The used band pass filter has a clock input. The center frequency of the band pass filter is equal to the input clock. So the input clock has to be in the vicinity of the wobble frequency to filter it out. Varying the input clock from low to high the output signal will get its maximum amplitude when the input clock is equal to the wobble frequency. For each disk type the wobble frequency is known. For an assumed disk type during a sweep around the wobble frequency of that disk type, the amplitude of the wobble signal is measured after the band pass filter. If the assumed disk type matches with the disk in the system, a significant amplitude curve will be measured.

As an example, once a 0.6 mm substrate has been found, a discrimination between 11 different DVD and HDDVD disk types needs to be done. The table below shows channel bit length, wobble lengths expressed in number of channel bits, track pitch and wobble period normalized to the wobble period of a DVD+ type disk. The wobble frequency is, during use, derived from the normalized wobble period and the (approximate) disk speed.

|  | Disk Type | Channel bit length | Wobble length | TrackPitch | Wobble period normalized |
|---|---|---|---|---|---|
| 1 | DVD-ROM | 133 nm | N.A. | 740 nm | N.A. |
| 2 | DVD+R |  | 32× |  | 1.0 |
| 3 | DVD+RW |  |  |  |  |
| 4 | DVD-R |  | 186× |  | 5.8 |
| 5 | DVD-RW |  |  |  |  |
| 6 | DVD-R-QFlix |  | 93× |  | 2.9 |
| 7 | DVD-RAM | 143 nm | 186× | 1230 nm | 6.2 |
| 8 | HDDVD-ROM | 102 nm | N.A. | 400 nm | N.A. |
| 9 | HDDVD-R |  | 93× |  | 2.2 |
| 10 | HDDVD-RW |  |  |  |  |
| 11 | HDDVD-RAM |  |  | 680 nm |  |

Likewise, for a 0.1 mm substrate (or cover layer) thickness, i.e. a BD-family disk, the parameters are listed below.

|  | Disk Type | Channel bit length | Wobble length | TrackPitch |
|---|---|---|---|---|
| B1 | BD-ROM | 74 nm | N.A. | 320 nm |
| B2 | BD-R |  | 69× |  |
| B3 | BD-RE |  |  |  |

Likewise, for a 1.2 mm substrate, i.e. a CD-family disk, the parameters are listed below.

|  | Disk Type | Channel bit length | Wobble length | TrackPitch |
|---|---|---|---|---|
| C1 | CD-ROM | 289 nm | N.A. | 1600 nm |
| C2 | CD-R |  | 196× |  |
| C3 | CD-RW |  |  |  |

Referring back to the 0.6 mm disk types, it is observed that the wobble frequencies are nicely distributed over the frequency range, as shown in the last column.

So when rotating the unknown disk substantially at a predetermined speed, one can compare the observed wobble frequency with the wobble frequencies as depicted in the table. From the comparison, the disk type can be recognized to be a disk type of one of the groups a) DVD-minus comprising DVD-R and DVD-RW; b) DVD-plus comprising DVD+R and DVD+RW; c) DVD-Qflix comprising DVD-R-Qflix; d) DVD-RAM comprising DVD-RAM; e) HDDVD-recordable comprising HDDVD-R, HDDVD-RW and HDDVD-RAM; or f) read-only comprising DVD-ROM and HDDVD-ROM.

Several methods are available to measure the wobble frequency. A wobble amplitude measurement may be performed with a scanning band pass filter. A PLL may be used to find a wobble PLL locking frequency, at which the wobble signal locks to a PLL center frequency associated with the frequency corresponding to a specific disk type or group of disk types. The wobble signal may be mixed with a sweeping sine wave and the combined signal may be integrate-and-dump to detected a correlation between the wobble signal and a frequency of the sweeping sine.

Detecting the presence of the wobble signal and determining the frequency characteristic of the wobble signal may be performed as a single operation. E.g., the signal analyzer may assume that the radial error signal comprises a wobble signal, scan the radial error signal with a band-pass filter for determining whether the radial error signal comprises a dominant frequency, and from the presence of a dominant frequency conclude that the wobble signal was indeed present and use the frequency value of the dominant frequency as the frequency characteristic.

In a further embodiment, to determine the frequency characteristic of the wobble signal, the signal analyzer is arranged to:

check whether the wobble signal comprises a frequency within a selected frequency range associated with a selected disk type, and if the check is positive, classify the optical disk as being of the selected disk type.

The selected disk type may e.g. be a DVD+R disk, and the selected frequency range may be a range around the wobble frequency associated with a DVD+R disk type (i.e. around a normalized wobble frequency of 1.0, referring to the table above). It is thus tested whether the inserted disk may be a DVD+R disk.

The check may e.g. use any method of detecting a dominant frequency, any method of correlation between the wobble signal and the frequencies within the frequency range or any other method of comparison between the wobble signal and the frequencies within the frequency range.

As the radial position may not be known very accurately at this moment during operation, the method preferably uses a frequency range with a significant width of e.g. +/−20% of the nominal wobble frequency. If however the radial position is accurately known, e.g. detected from an accurate sledge position, the frequency range may be very narrow, and substantially be a single frequency corresponding to the exact wobble frequency associated with the selected disk type.

Note that the disk type may at this stage still comprise a group of multiple disk types associated with the same wobble frequency, as e.g. a DVD+R and a DVD+RW disk have the same wobble frequency. When needed, a further classification may then be performed, e.g. in closed-loop radial tracking from decoding wobble data generated by the modulated wobble signal.

In a further embodiment, the check is performed using each frequency range of a plurality of frequency ranges as the selected frequency range until the check is positive or, if no check is positive, until all frequency ranges have been tested, wherein each of the plurality of frequency ranges is associated with a corresponding disk type from a plurality of disk types, and each of the plurality of frequency ranges being substantially different from the other frequency ranges of the plurality of frequency ranges.

The signal analyzer may be arranged to when the checks are all negative, classify the optical disk as being of yet-unknown type.

The signal analyzer may be arranged to, upon detecting that no wobble signal is present, classify the optical disk as being of yet-unknown type.

Several alternative techniques may be used to detect the presence of a carrier frequency with a certain frequency band.

In an embodiment, to check whether the wobble signal comprises a frequency within the selected frequency range associated with the selected disk type, the signal analyzer is arranged to:

derive a band-passed signal from the wobble signal by applying a band-pass filter associated with the selected frequency range to the wobble signal, check the band-passed signal for the presence of a significant amplitude or power.

In an alternative embodiment, to check whether the wobble signal comprises a frequency within the selected frequency range associated with the selected disk type, the signal analyzer is arranged to:

check whether a phase lock loop locks to the wobble signal at a frequency within the selected frequency range.

Similar loops, such as a frequency lock loop, are considered equivalent to the phase lock loop and their application for detecting the presence of a frequency are within the scope of the invention.

In an embodiment, the optical disk drive further comprises a signal decoder arranged to:

receive the sensor output signal at least after the deriving of the disk type indicator and while the optical arrangement is focusing the incident beam into a reading spot on the optical disk, positioning the reading spot at a radial position along the disk and tracking the track with the reading spot, wherein the radial position along the disk comprises disk information data, the disk information data comprising at least a disk type identifier, retrieve the disk type identifier from the sensor output signal, and deriving the disk type from the disk type indicator and the disk type identifier.

The disk type recognition is thus completed by reading disk information data comprising the disk type identifier from the disk. E.g. when the disk type indicator concluded from the wobble frequency that the disk type is from the group of "DVD-minus" types (i.e. DVD-R or DVD-RW), the disk type identifier may further specify this as "DVD-RW" type.

The disk information data may be coded on the disk as a modulation of the wobble carrier frequency of the wobbled track, e.g. as a phase modulation or a frequency modulation, in so-called ADIP data. Alternatively or additionally, disk information data may be coded in e.g. embossed pits in e.g. a lead-in zone, or so-called land pre-pits as in DVD-R, headers interrupting the track, or headers in between the tracks as in DVD-RAM.

Reading the disk type identifier may also be used to confirm that the disk type as determined from the frequency measurement is indeed the disk type of the disk. This may be especially useful to be robust against mistaking a newly introduced disk type similar to a known disk type for the known disk type.

In an embodiment, the optical arrangement comprises an objective lens arranged for focusing the incident beam into the spot on the optical disk, and
wherein the disk type of the optical disk may at least be either a first disk type or a second disk type,
the first disk type being associated with a first disk standard corresponding to a first laser color of the incident beam and a first numerical aperture of the objective lens relating to a first spot size of the spot,
the second disk type being associated with a second disk standard corresponding to a second laser color of the incident beam and a second numerical aperture of the objective lens relating to a second spot size of the spot, the second spot size being different from the first spot size,
and wherein the signal analyzer is arranged to receive the radial error signal from the sensor while the incident beam is focused on the optical disk with the second laser color and the second numerical aperture for deriving the disk type indicator.

The first disk type may e.g. be the group of all DVD disk types associated with a red laser and a NA of 0.60 and the second disk type may e.g. be the group of all HDDVD disk types associated with a blue laser and a larger NA of 0.67. As the spot size relates to the laser color parameterized with a wavelength λ and the NA with the ratio of the wavelength and the NA (a typical measure is λ/(2*NA)), the spot sizes corresponding to DVD and HDDVD standards are different.

The first spot size may be either smaller or larger, i.e. the disk type recognition may be done with either the first laser color and the first numerical aperture or with the second laser color and the second numerical aperture.

The first laser color and second laser color may be different, but may also be the same when the first and second numerical aperture are different.

The first NA and second NA may be different, but may also be the same when the laser color and second laser color are different.

The first and second disk standards may relate to the standards as defined in a standardization document, such as the so-called Orange Book for CD. Alternatively or additionally, disk standard parameters may relate to driver-maker defined standard values or standard settings, such as default settings of operation parameters or driver-maker selected deviations of e.g. the numerical aperture of the objective lens (e.g., using a somewhat larger NA).

When the discrimination between the two groups is done according to this aspect of the invention, it is not required to perform a trial-and-error method using the red and the blue laser, and corresponding NA, in turn. In stead, the recognition may advantageously be performed with any of the two conditions, e.g. with the red laser with the smaller NA or the blue laser with the larger NA. There is thus no need to change between laser color for recognizing the disk type, at least not up to the point where disk information needs to be read from the disk to discriminate between closely related types, such as DVD-R and DVD-RW.

In an embodiment, the second spot size is smaller than the first spot size.

The use of the smaller spot size during disk type recognition may allow to resolve small features better than the use of the larger spot size.

E.g., no radial track error signals, i.e. radial error signals generated from a single track, are observed when a red laser is used on a blue-HDDVD substrate, except in the very narrow dedicated system lead-in area. The red laser optical cut-off period is $$\frac{\lambda}{2NA} = \frac{650}{2 \cdot 0.67} = 485 \text{ nm.}$$

That means that a periodical structure with period smaller than 485 nm will not generate any diffraction related signal. As the HDDVD track pitch is only 400 nm, no radial track error signal can be observed with a red laser.

However, when using a blue laser, one can observe radial track error signals, like the push pull signal and the high frequency wobble signal, from a red-DVD substrate too. For the blue laser the optical cut-off period is:

$$\frac{\lambda}{2NA} = \frac{405}{2 \cdot 0.67} = 302 \text{ nm.}$$

As a result, one can observe a radial error signal with a blue laser (l=405 nm) in all cases. Hence, also the wobble signal generated by the wobbled track can be observed, and the wobble frequency can be determined.

Therefore, in a early phase of the disk ID, the recordable HD-DVD and recordable DVD disk types can positively identified prior to closing the radial tracking servo.

In an embodiment, the second spot size is larger than the first spot size.

E.g., when discriminating between DVD and HDDVD disk types, a red laser may be used, despite the spot size being too large to resolve the individual tracks as discussed above.

Surprisingly, also a wobble signal may be detected when using a red laser focused on a HDDVD substrate and also from this signal the wobble frequency can be determined. The wobble signal thus observed may be caused by diffraction from grooves at a distance of twice the track pitch that have different frequency and phase as observed by the large red spot.

The use of a red laser may be beneficial as the most frequently used disk types of disks with a 0.6 mm substrate are the DVD disk types, associated with a red laser and the larger spot size of the first spot size and the second spot size. Moreover, HDDVD-recordable disks are standardized for backward compatibility: compatibility requires the HDDVD-recordable disks and the marks recorded thereon to be robust against reading with a red laser. As a result, no damage can be done to the HDDVD-recordable disks and to the written marks thereon by reading with a red spot associated with the DVD beam conditions, whereas a blue laser might damage marks on a DVD-recordable disk.

In an embodiment, the signal analyzer is arranged to, upon detecting the presence of the wobble signal:
classify the optical disk in dependence on the frequency characteristic, and
to determine the frequency characteristic of the wobble signal, the signal analyzer is arranged to:
check whether the wobble signal comprises a frequency within a selected frequency range associated with a selected disk type, the selected disk type being selected from the group consisting of the first disk type and the second disk type, and if the check is positive, classify the optical disk as being of the selected disk type, if the check is negative, further check whether the wobble signal comprises a frequency within a further frequency range associated with a further disk type, the further disk type being selected from the group consisting of the first disk type and the second disk type, the further disk type being different from the selected disk type and if the further check is positive, classify the optical disk as being of the further disk type, and after classification of the optical disk as being of either the first or the second type, the optical disk drive is arranged to be subsequently operated with:

the optical source generating the incident beam with either the first laser color, upon classification of the optical disk as being of the first type, or the second laser color upon classification of the optical disk as being of the second type, and the optical arrangement focusing the incident beam into a reading spot on the optical disk, positioning the reading spot at a radial position along the disk and tracking the track with the reading spot.

Thus, the laser color and NA associated with the disk type is used for normal tracking for reading, and when applicable writing, of the disk.

In an embodiment, the first laser color corresponds to a wavelength between 625 and 695 nm, the first numerical aperture is between 0.55 and 0.70, the second laser color corresponds to a wavelength between 390 and 420 nm, the second numerical aperture is between 0.55 and 0.70.

This corresponds to the first disk type being in the DVD-family group, associated with a red laser and a NA of 0.60 according to the DVD standard. Note that the disk drive may use a NA different from the standard, e.g. a somewhat lager NA, e.g. 0.67, for e.g. having an improved resolving power of the spot.

This embodiment corresponds to the second disk type being a HD-DVD associated with a blue laser and a NA of 0.67.

This embodiment thus corresponds to discrimination DVD and HDDVD types using either a red or a blue laser.

In an embodiment, the first laser color corresponds to a wavelength between 390 and 420 nm and the first numerical aperture is between 0.70 and 0.90.

This corresponds to the first disk type being a BD-family disk type, associated with a blue laser and a NA of 0.80.

In an embodiment, the first laser color corresponds to a wavelength between 625 and 695 nm, the first numerical aperture is between 0.55 and 0.70, the second laser color corresponds to a wavelength between 770 and 790 nm, the second numerical aperture is between 0.35 and 0.50.

This corresponds to the first disk type being in the DVD-family group, associated with a red laser and a NA of 0.60 according to the DVD standard. Note that the disk drive may use a NA different from the standard, e.g. a somewhat lager NA, e.g. 0.67, for e.g. having an improved resolving power of the spot.

This embodiment corresponds to the second disk type being a CD associated with a infrared laser and a NA of 0.40.

This embodiment thus corresponds to discrimination CD and DVD types using either a red or an IR laser.

The disk type indicator and the disk type may relate to an individual disk type or a group of disk types, wherein the group of disk types comprises at least one of the disk types from the group consisting of:

a DVD-R disk type associated with DVD-R, a DVD-RW disk type associated with DVD-RW, a DVD-minus disk type associated with DVD-R and DVD-RW, wherein the DVD-R and DVD-RW disk types in the group have the same wobble frequency, a DVD+R disk type associated with DVD+R, a DVD+RW disk type associated with DVD+RW, a DVD-plus disk type associated with DVD+R and DVD+RW, wherein the DVD+R and DVD+RW disk types in the group have the same wobble frequency, a DVD-R-QFlix disk type associated with DVD-R-QFlix, a DVD-QFlix disk type associated with at least DVD-R-QFlix, a DVD-RAM disk type associated with DVD-RAM, a HDDVD-R disk type associated with HDDVD-R, a HDDVD-RW disk type associated with HDDVD-RW, a HDDVD-RAM disk type associated with HDDVD-RAM, a HDDVD-recordable disk type associated with HDDVD-R, HDDVD-RW and HDDVD-RAM, all these disk types having the same wobble frequency, a BD-R disk type associated with BD-R, a BD-RE disk type associated with and BD-RE, a BD-recordable disk type associated with BD-R and BD-RE, a general recordable disk type associated with at least one of the DVD-minus disk type, the DVD-plus disk type, the DVD-QFlix disk type, the DVD-RAM disk type, the HDDVD-minus disk type, the HDDVD-RAM disk type, all being recordable or rewritable disk types, a HDDVD-ROM disk type associated with HDDVD-ROM, a DVD-ROM disk type associated with DVD-ROM, a HDDVD-ROM disk type associated with HDDVD-ROM, a BD-ROM disk type associated with BD-ROM, a general ROM disk type associated with at least one of the DVD-ROM disk type and the HDDVD-ROM disk type, all being read-only disk types, a yet-unknown type associated with the disk type not yet having been determined, a not-supported type associated with disk types not supported by the optical disk drive.

When the disk is not recognized as being one of a recordable or rewritable disk, the disk drive may continue to identify whether the disk is one of the known read-only disk types. E.g., when the disk drive supports all four generations, the disk drive may identify the optical disk as being of either the CD-ROM, DVD-ROM, HDDVD-ROM or BD-ROM disk type, or of an unknown or unsupported type.

When the disk drive already detected the disk to be of a 0.6 min substrate family, the disk drive may restrict the identification to be of either the DVD-ROM or the HDDVD-ROM type. As discussed above, HDDVD disks comprise a very small part of the disk that can be read with the red DVD laser. In prior art optical drives the discrimination between DVD and HDDVD disks, in particular between DVD-ROM and HDDVD-ROM disks, is done by reading this part of the disk. To read this part of the disk the system has to be calibrated for the DVD channel. When it turns out that the disk is a HDDVD disk, the HDDVD channel has to be calibrated. The disadvantage of this method is the long start-up times. Embodiments of the invention provide a method to determine if a disk is of the DVD-ROM or a HDDVD-ROM type just after the wobble disk detection and in radial open loop. The method may also be applied to discriminate between other generations of ROM disks, e.g. between a CD-ROM and a DVD-ROM. Like the detection of the presence of a wobble signal, the scheme to detect the type of read-only disk also just requires a closed focus loop, and is largely done with an open radial tracking loop and with settings for the DPD radial servo method still undetermined.

Only after the disk type, e.g. the HDDVD-ROM or DVD-ROM disk type, is successfully determined, the drive selects the proper tracking method settings and laser setting.

In an embodiment of the optical disk drive,
the sensor output signal further comprises a central aperture signal with a signal amplitude, and
the optical disk drive further comprises a HF signal analyzer arranged to, at least when the optical disk is not classified as being one in a pre-determined group of disk types:
receive the central aperture signal from the sensor while the incident beam is focused onto the optical disk and before tracking the track,
analyze the signal amplitude of the central aperture signal, and
determine the disk type from at least a first variation of the signal amplitude of the central aperture signal as a function of time.

I.e., at least when the optical disk is not identified during the wobble-based disk type detection of recordable and rewritable disks, the HF signal analyzer continues to analyze the central aperture signal.

The HF signal analyzer determines the disk type from at least the variation of the signal amplitude.

The variation of the signal amplitude may correspond to the variation of maximum values of the amplitude of the signal amplitude, to minimum values, to average values, an envelope of the signal or to any other suitable signal level of the signal amplitude of the central aperture signal.

The determining of the disk type of the optical disk using the central aperture signal may also be performed independent of the determining of the disk type based on the presence and characteristic of the wobble signal.

In an embodiment of the optical disk drive for determining a disk type of an optical disk comprising a substantially circular track comprising a sequence of marks and a land portion separating adjacent parts of the track spaced at a track pitch, the optical disk drive comprises:
an optical source for generating an incident beam,
an optical arrangement for focusing the incident beam onto the optical disk into a spot with a spot size, for positioning the spot at a radial position along the disk and for tracking the track,
a sensor for sensing a reflected beam produced by the optical disk upon receiving the incident beam, and for producing a sensor output signal comprising a central aperture signal with a signal amplitude,
a HF signal analyzer arranged to:
receive the central aperture signal from the sensor while the incident beam is focused onto the optical disk and before tracking the track,
analyze the signal amplitude of the central aperture signal, and
determine the disk type from at least a first variation of the signal amplitude of the central aperture signal as a function of time.

The signal amplitude may e.g. be a signal level of the central aperture signal, an upper level of the central aperture signal, a lower level of the central aperture signal, a peak-peak level of the central aperture signal, an envelope of the central aperture signal or an average level of the central aperture signal. The signal amplitude may be filtered with e.g. a low-pass filter or a band-pass filter. The signal amplitude may be a combination of one or more of the listed levels, e.g. the ratio of two levels.

The HF signal analyzer may be arranged to measure a modulation depth of the signal amplitude as the variation of the signal amplitude as a function of time.

The HF signal analyzer may be arranged to measure a standard deviation (or equivalently variance or RMS) of the signal amplitude as the variation of the signal amplitude as a function of time.

There are various differences between the disk parameters of a DVD and a HDDVD. One of them is the track pitch: For DVD the track pitch is 740 nm and for HDDVD the track pitch is 400 nm in the data area. The spot diameter of the blue 405 nm wavelength laser at a NA of 0.67 is about 300 nm. The spot diameter of the red 650 nm wavelength laser at an NA of 0.67 is about 485 nm.

Consider the situation wherein a blue spot is used. When focusing on a DVD-ROM disk, the spot on the disk is comparable to or even smaller than the width of the grooves. As the RF signal is in the groove and the land contains no information, there will be a clear central aperture signal when spot position is on the groove, whereas there is only a small central aperture signal when the spot position is on. However, when focusing on a HDDVD-ROM disk, where the lands and grooves are smaller than the spot, a large and very similar central aperture signal is present when the spot position is in the groove or on the land in between the grooves. Hence, when the system is in focus and in radial open loop and the spot crosses grooves and lands, the track crossings are seen in the open loop central aperture signal. The signal may also be referred to as a track cross signal.

Detecting the presence and size of the track cross signal may thus be used to discriminate between a DVD-ROM and a HDDVD-ROM disk type when focusing with a blue laser.

It was noted that the track cross signal is also different between a DVD-ROM type and a HDDVD-Rom type disk when focusing with a red laser.

Discrimination between DVD-ROM and HDDVD-ROM disk types may thus be performed with any of the two associated laser colors based on the track cross signal, i.e. using the central aperture signal while focusing on the disk and while in open loop radial tracking mode.

The analysis may employ a low pass filter, filtering the central aperture signal to result in a low frequency radial error signal. Again, when using a blue spot, because of the big track pitch for DVD (relative to the blue spot), the amplitude of the central aperture signal will be very small between the tracks and resulting in a big track cross signal after filtering. For HDDVD the difference between the amplitudes of the central aperture signal on track and between the tracks is small. So the amplitude of the low pass filtered track cross signal is also small. The decision between DVD and HDDVD may thus be done by measuring the amplitude of the track cross signal and the amplitude of the Low Passed track cross signal, and taking the ratio between the two amplitudes. When the ratio between the non-filtered and the filtered amplitude is below a first pre-determined threshold, the disk type is determined to be DVD-ROM, when above a second pre-determined threshold, the disk type is determined to be HDDVD-ROM.

In an embodiment, for determining the first variation of the signal amplitude, the HF signal analyzer is arranged to:

determine a filtered signal from low-pass filtering the signal amplitude of the central aperture signal as a function of time, the filtered signal having a filtered signal amplitude, determine the first variation from the filtered signal as a function of time.

E.g., when the disk type is expected to be one of DVD-ROM and HDDVD-ROM, the disk type may be determined from the variation.

E.g., when the first variation of signal amplitude is measured as the peak-peak amplitude of the central aperture signal, classifying as HDDVD-ROM when the signal amplitude is below a first pre-determined threshold level and as DVD-ROM when the signal amplitude is above a second pre-determined threshold level, or alternatively within pre-determined ranges.

As another example, when the first variation of signal amplitude is measured as the variance of the modulation of the central aperture signal, classifying as HDDVD-ROM when the signal amplitude is below a first pre-determined variance threshold and as DVD-ROM when the signal amplitude is above a second pre-determined variance threshold.

Low-pass filtering may e.g. be performed on the instantaneous value of the amplitude of the central aperture signal.

Alternatively, low-pass filtering may e.g. be performed on the bottom value of the amplitude of the central aperture signal, resulting in a two times larger variation than low-pass filtering the instantaneous value of the amplitude of the central aperture signal, hence a better signal-to-noise ratio.

Alternatively, the low-pass filtering may be associated with obtaining the variation of the envelope of the central aperture signal, which results in a similar signal-to-noise ratio as low-pass filtering the bottom value of the amplitude of the central aperture signal.

In an embodiment, for determining the disk type, the HF signal analyzer is arranged to:

determine a second variation of the signal amplitude from the central aperture signal as a function of time before low-pass filtering the signal amplitude of the central aperture signal, determine the disk type from the first variation and the second variation.

E.g. when the disk type is expected to be one of DVD-ROM and HDDVD-ROM, the disk type may be determined from the variation. E.g. when the first variation of signal amplitude is measured as the low-pass filtered peak-peak amplitude of the central aperture signal, the second variation of signal amplitude is measured as the non-filtered peak-peak amplitude of the central aperture signal, and classifying as HDDVD-ROM when the ratio of the first and second variation is below a first pre-determined threshold level and as DVD-ROM when the ratio is above a second pre-determined threshold level, or alternatively within pre-determined ranges.

In an embodiment, the optical arrangement comprises an objective lens for focusing the incident beam onto the optical disk, and wherein the disk type is selected from a first ROM disk type and a second ROM disk type, the first ROM disk type being associated with a first disk standard corresponding to a first laser color of the incident beam and a first numerical aperture of the objective lens relating to a first spot size and a first track pitch, the second ROM disk type being associated with a second disk standard corresponding to a second laser color of the incident beam and a second numerical aperture of the objective lens relating to a second spot size and a second track pitch, the second spot size being different from the first spot size and the second track pitch being different from the first track pitch, and wherein the HF signal analyzer is arranged to receive the central aperture signal from the sensor while the incident beam is focused onto the optical disk with the second laser color and the second numerical aperture for determining the disk type.

As described above, the detection may thus be performed with a single measurement with any of the laser colors and numerical apertures associated with any of the supported disk types, and is not necessarily performed in a trial-and-error manner with each of the possible laser colors and numerical apertures.

In an embodiment, the second spot size is smaller than the first spot size and the second track pitch is smaller than the first track pitch.

The use of the smallest spot size may result in the largest track cross signal.

In an embodiment, after determining the disk type as being of either the first ROM disk type or the second ROM disk type, the optical disk drive is arranged to be subsequently operated with:

the optical source generating the incident beam with either the first laser color upon determining the optical disk as being of the first ROM disk type, or the second laser color upon determining the optical disk as being of the second ROM disk type, and the optical arrangement focusing the incident beam into a reading spot on the optical disk, positioning the reading spot at a radial position along the disk and tracking the track with the reading spot.

Hence, after the disk type has been recognized, the disk is further accessed with the correct optical beam conditions corresponding to the disk type of the disk in the drive, i.e. with the laser color and numerical aperture of the associated disk standard.

In an embodiment, the first laser color corresponds to a wavelength between 625 and 695 nm, the first numerical aperture is between 0.55 and 0.70, the first track pitch is between 700 and 800 nm, the second laser color corresponds to a wavelength between 390 and 420 nm, the second numerical aperture is between 0.55 and 0.90, the second track pitch is between 350 and 450 nm.

The first laser color and first numerical aperture relate to a DVD-ROM with a red laser, the second laser color and second numerical aperture related to a HDDVD-ROM with a blue laser. This embodiment allows to discriminate between DVD-ROM and HDVD-ROM with a blue laser. Alternatively, discrimination between DVD-ROM and HDVD-ROM may be performed with a red laser.

Alternative embodiments apply laser colors and numerical apertures associated with discriminating between other disk families, e.g. discriminating between CD and DVD with a red laser.

The invention also provides a method for determining a disk type of an optical disk comprising a substantially circular track for use with an optical disk drive for scanning the optical disk, the optical disk drive comprising:

an optical source for generating an incident beam, an optical arrangement for focusing the incident beam into a spot on the optical disk, for positioning the spot at a radial position along the disk and for tracking the track, and a sensor for sensing a reflected beam produced by the optical disk upon receiving the incident beam, and for producing a sensor output signal comprising a radial error signal, wherein the method comprises:
receiving the radial error signal while the incident beam is focused onto said optical disk and before tracking the track,
analyzing the radial error signal for detecting whether a wobble signal is present, indicating whether the track is wobbled, and
deriving a disk type indicator from the wobble signal, if present, indicating whether the optical disk is one of a group of disk types.

In a further embodiment of the method for use with an optical disk drive with the sensor output signal further comprising a central aperture signal with a signal amplitude, the method is further comprising:
at least when the optical disk is not classified as being one in a pre-determined group of disk types:
receiving the central aperture signal from the sensor while the incident beam is focused onto the optical disk and before tracking the track,
analyzing the signal amplitude of the central aperture signal, and
determining the disk type from at least a first variation of the signal amplitude of the central aperture signal as a function of time.

The invention also provides a method for determining a disk type of an optical disk comprising a substantially circular track comprising a sequence of marks and a land portion separating adjacent parts of the track spaced at a track pitch, for use with an optical disk drive for scanning the optical disk, the optical disk drive comprising:
an optical source for generating an incident beam,
an optical arrangement for focusing the incident beam onto the optical disk into a spot with a spot size, for positioning the spot at a radial position along the disk and for tracking the track,
a sensor for sensing a reflected beam produced by the optical disk upon receiving the incident beam, and for producing a sensor output signal comprising a central aperture signal with a signal amplitude, wherein the method comprises:
receiving the central aperture signal from the sensor while the incident beam is focused onto the optical disk and before tracking the track,
analyzing the signal amplitude of the central aperture signal, and
determining the disk type from at least a first variation of the signal amplitude of the central aperture signal as a function of time.

The invention further provides a computer program product arranged to be loaded in a processor and after being loaded allowing the processor to carry out one of the methods described above.

SHORT DESCRIPTION OF FIGURES

These and other aspects of the invention will be further elucidated and described in detail with reference to the drawings, in which corresponding reference symbols indicate corresponding parts:

FIG. 1a schematically shows the top-view of an optical disk;

Figure 2:
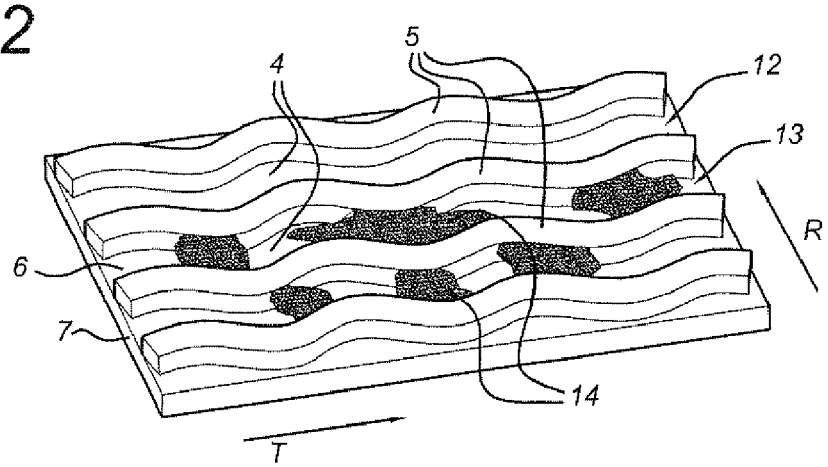
Figure 3:
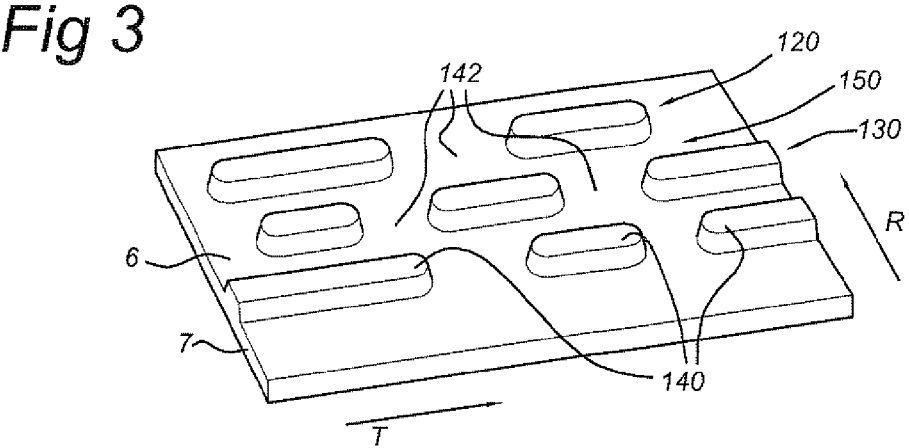
Figure 5:
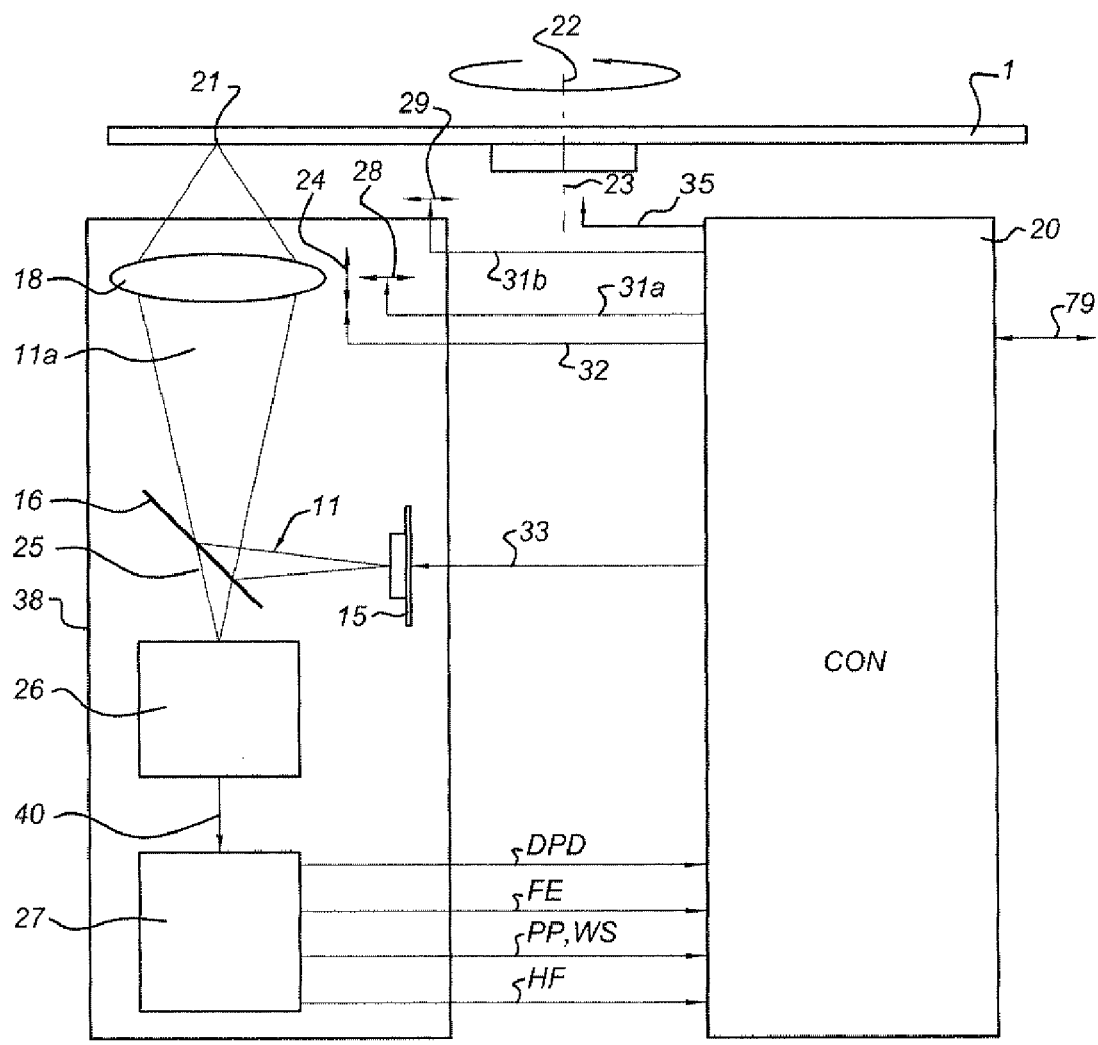
Figure 6:
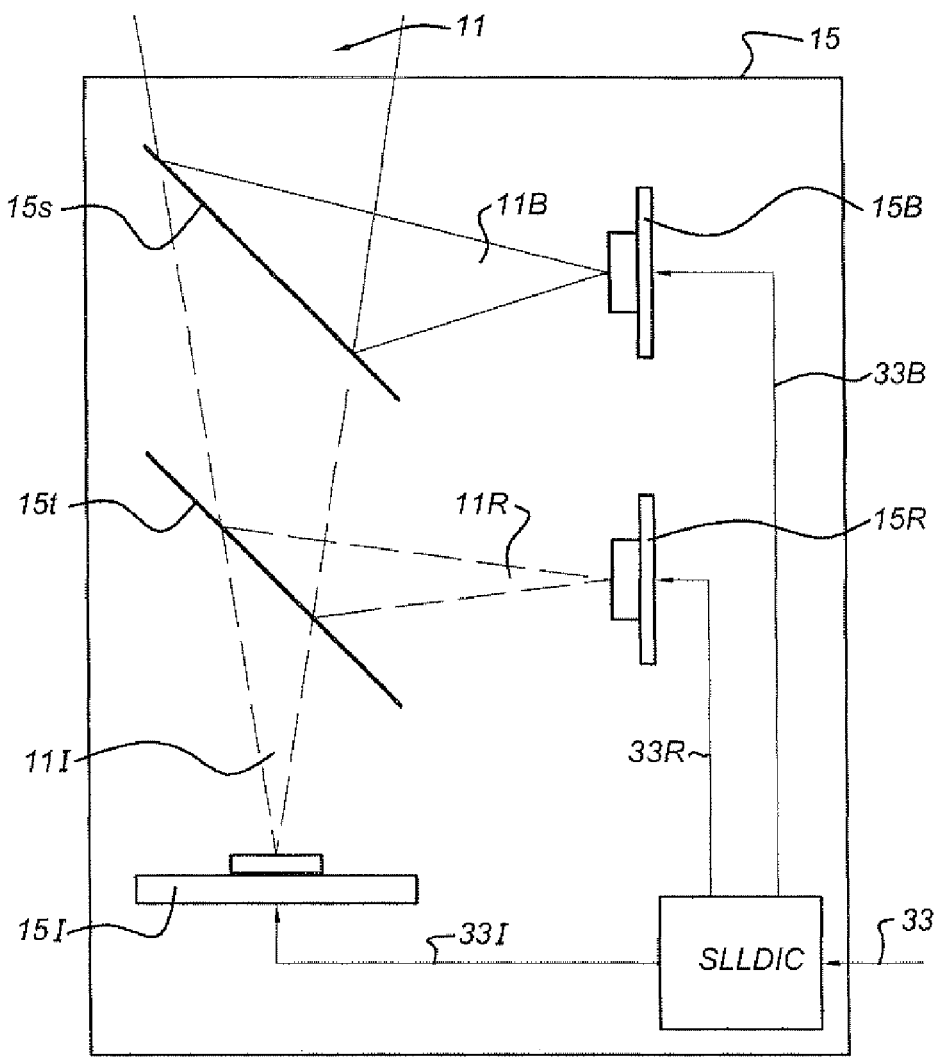
Figure 7:
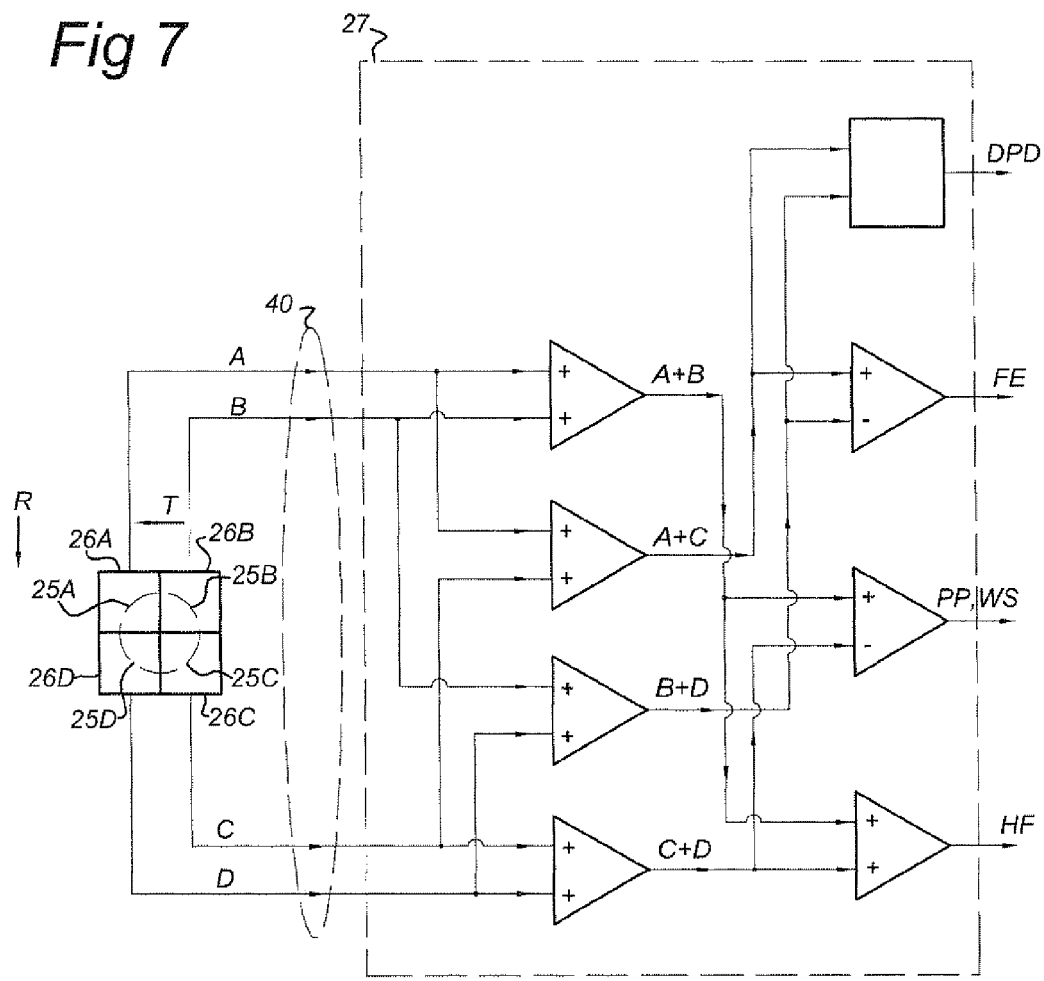
Figure 8:
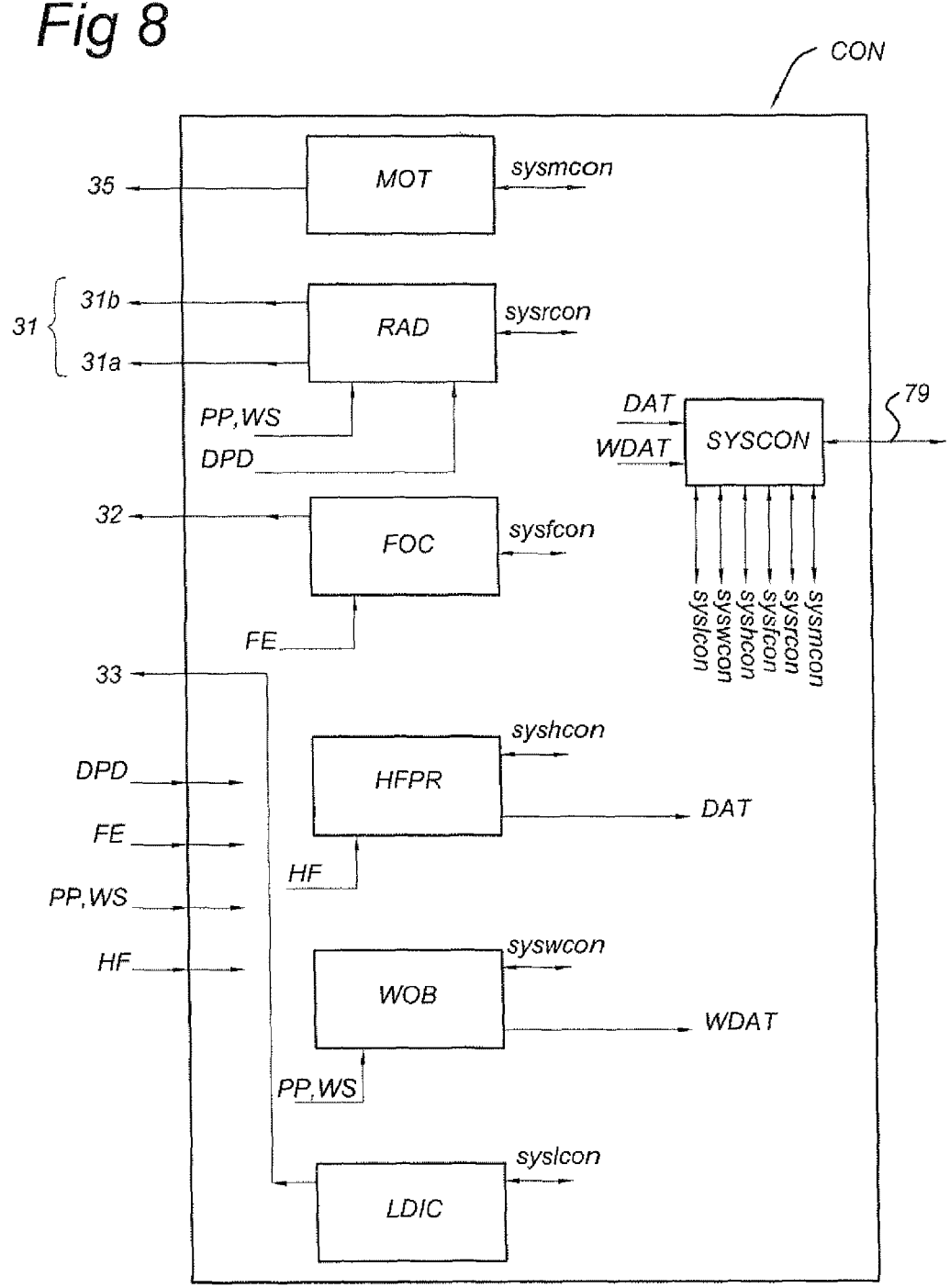
Figure 9:
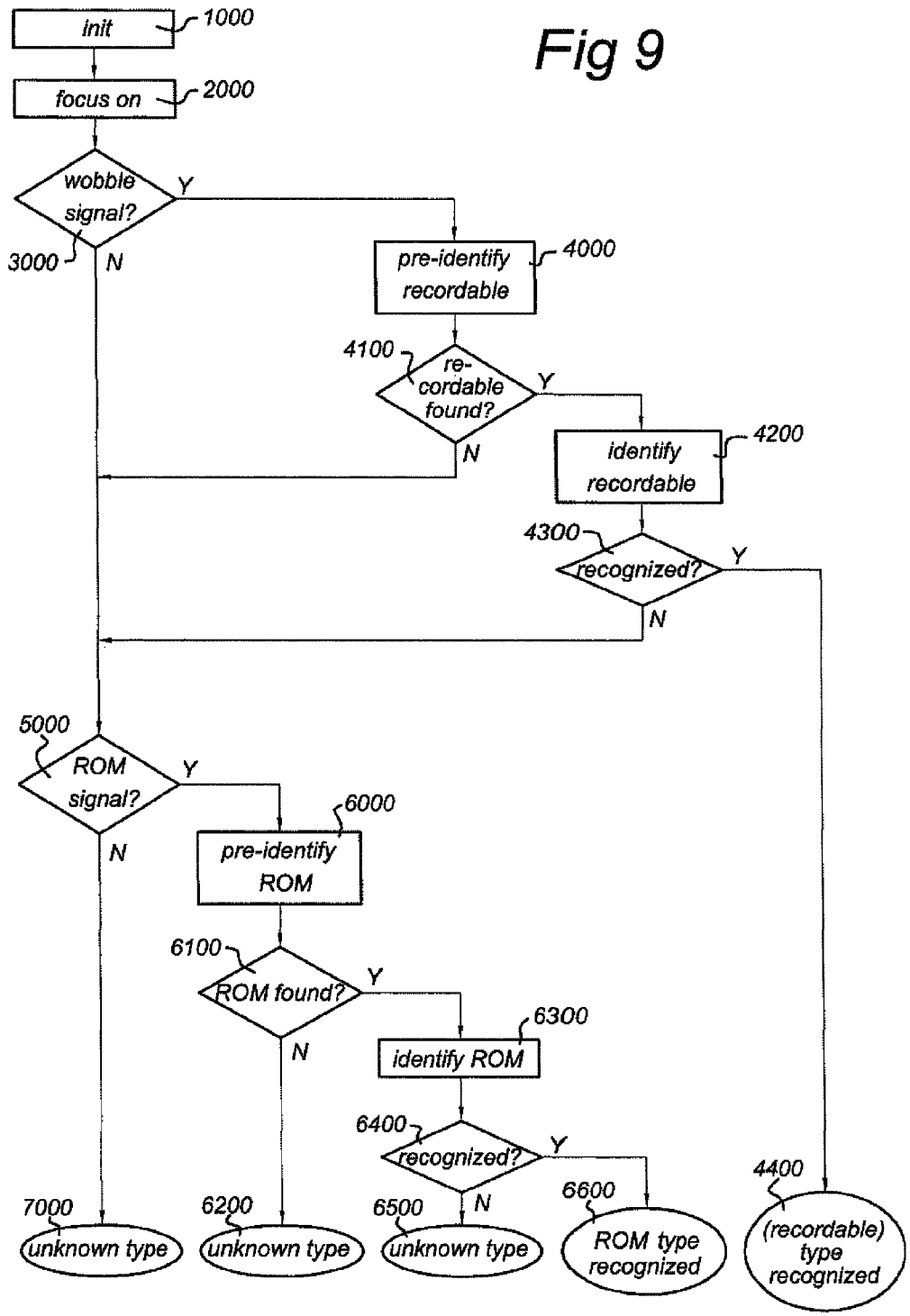
Figure 12A:
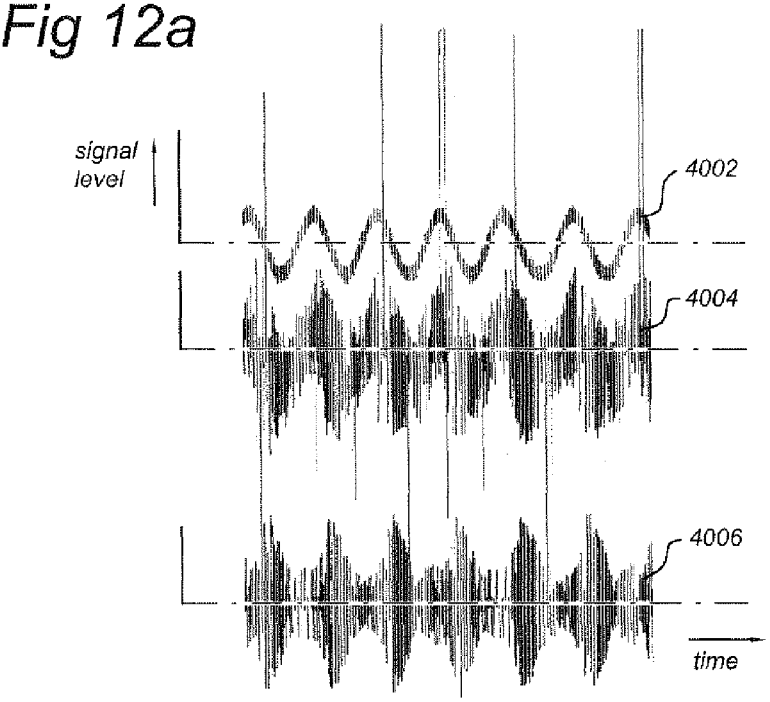
Figure 12B:
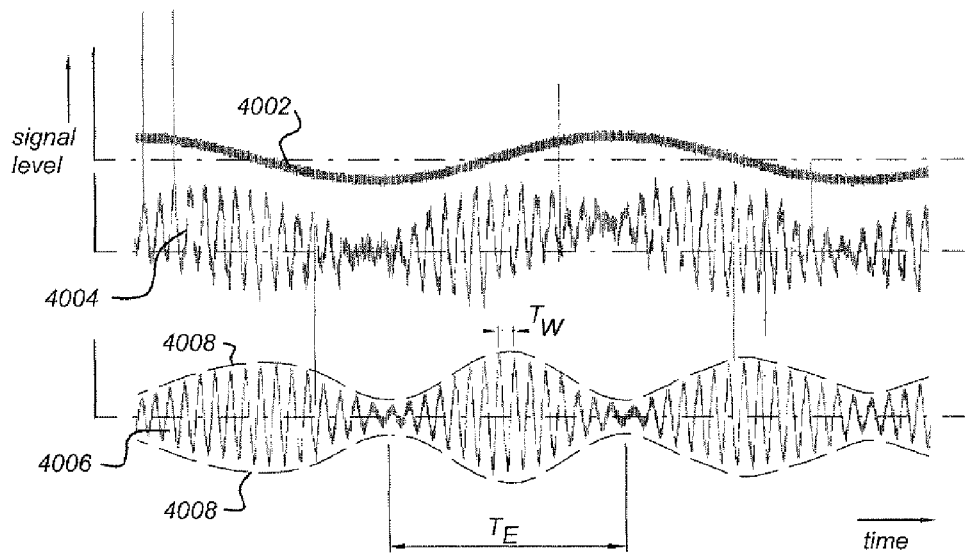
Figure 13A:
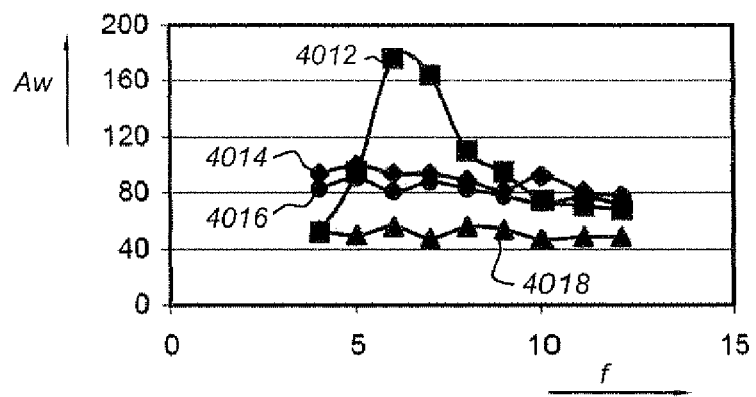
Figure 13B:
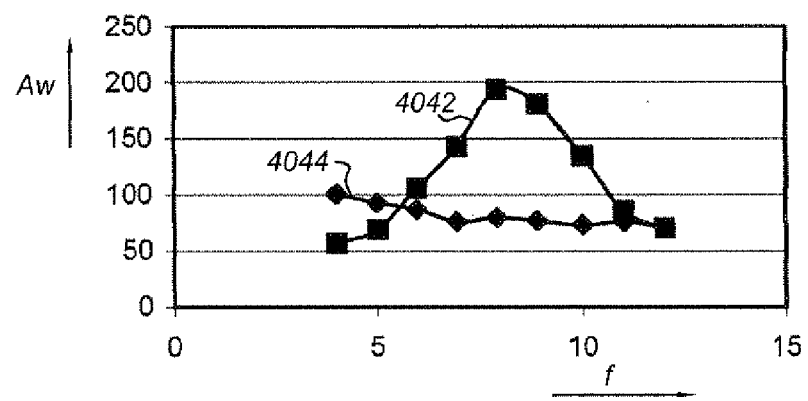
Figure 14:
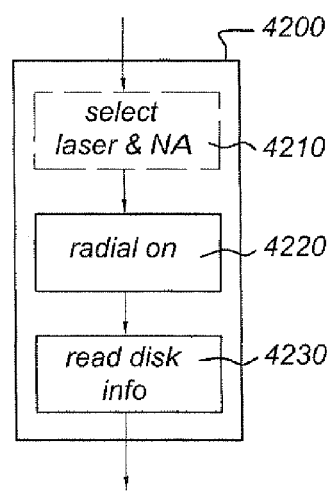
Figure 16:
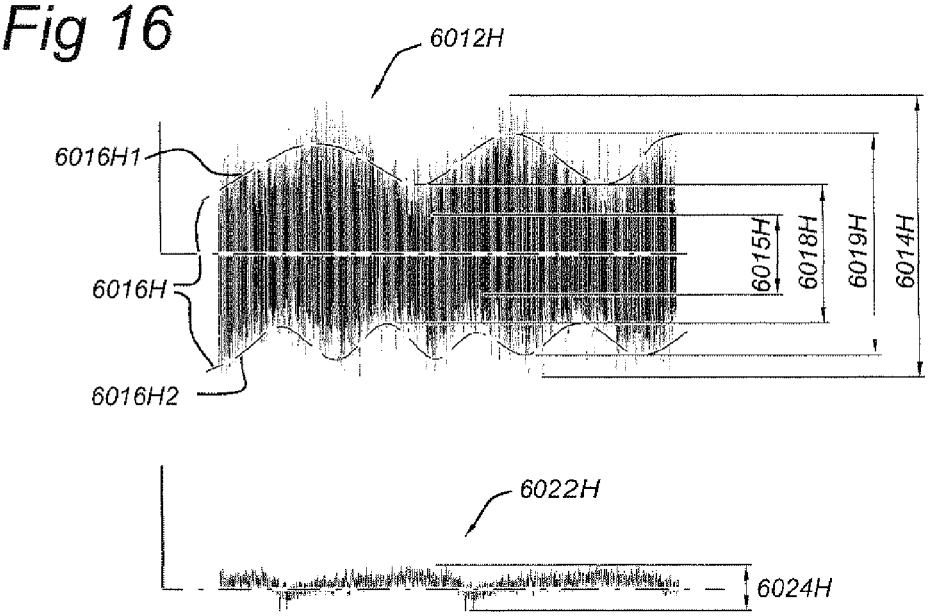
Figure 17:
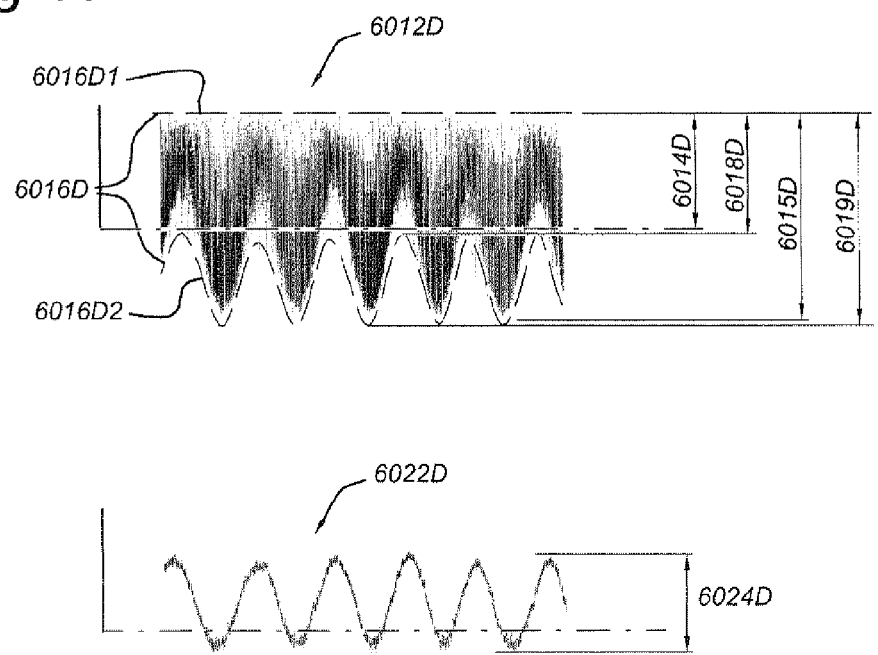
Figure 18:
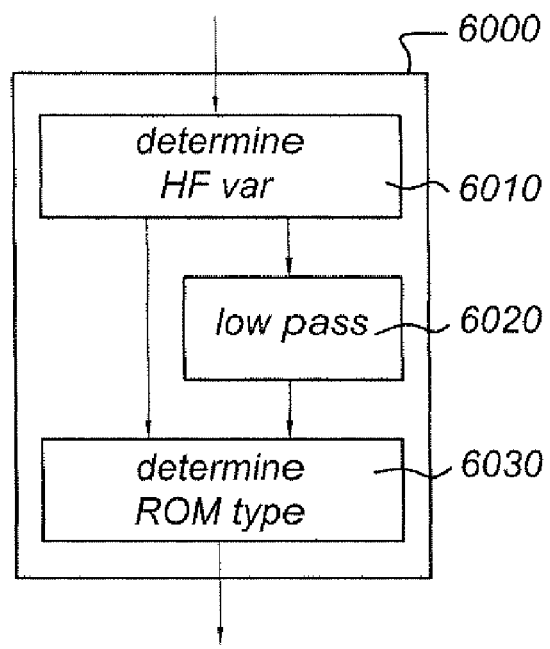
Figure 19:
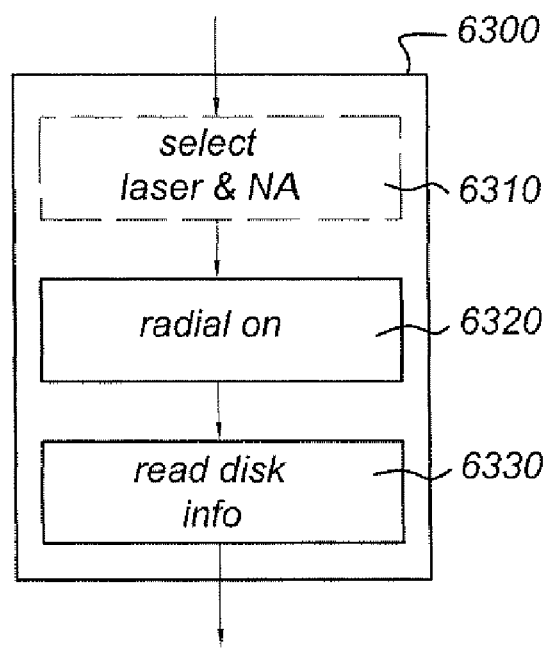
Figure 20:
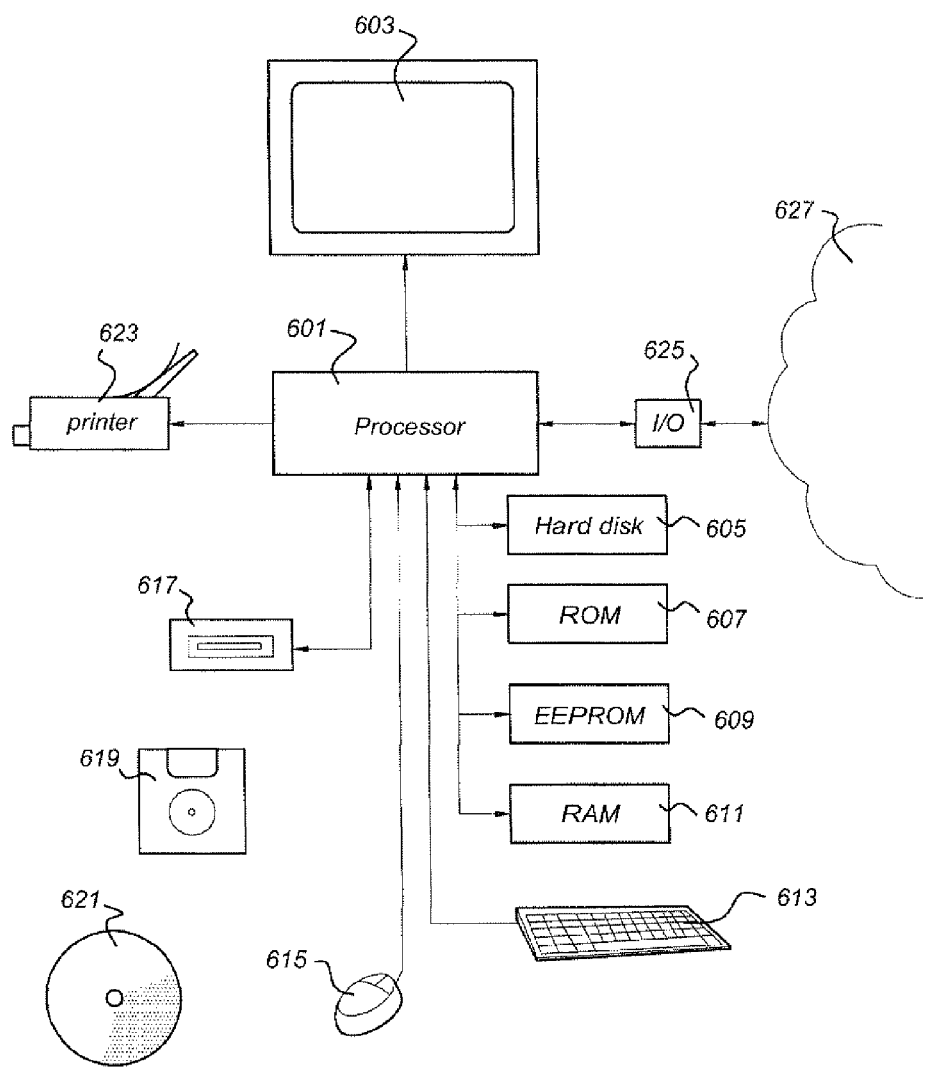

FIG. 2 schematically shows a wobbled groove and recorded information marks in the grooves on an optical disk of one of a recordable or rewritable types;

FIG. 3 schematically shows embossed marks on an optical disk of a read-only type;

FIG. 4 schematically shows cross sections of optical disk of the four different disk families, CD, DVD, HDDVD and BD and the associated incident beams;

FIG. 5 schematically shows an optical disk drive;

FIG. 6 schematically shows an optical source comprising a plurality of laser diodes of three different colors;

FIG. 7 schematically shows a signal processing unit of an optical disk drive;

FIG. 8 schematically shows a controller of an optical disk drive;

FIG. 9 schematically shows an embodiment of a method according to the invention;

FIG. 10 and FIG. 11a-11e schematically show embodiments of elements of the method according to the invention;

FIG. 12a and FIG. 12b schematically show a radial error signal and a wobble signal;

FIG. 13a and FIG. 13b show an exemplary measurement of a wobble frequency detection and measurement;

FIG. 14 schematically shows an embodiment of an element of the method according to the invention;

FIG. 15 schematically shows embossed marks on an optical disk of a read-only type and spot sizes;

FIG. 16 and FIG. 17 schematically shows a track cross signal and low-pass filtered track-cross signal;

FIG. 18 schematically shows an embodiment of an element of the method according to the invention;

FIG. 19 schematically shows embodiments of elements of the method according to the invention;

FIG. 20 shows an overview of a computer arrangement that can be used to carry out the method according to the invention.

DETAILED DESCRIPTION

Figure 1A:
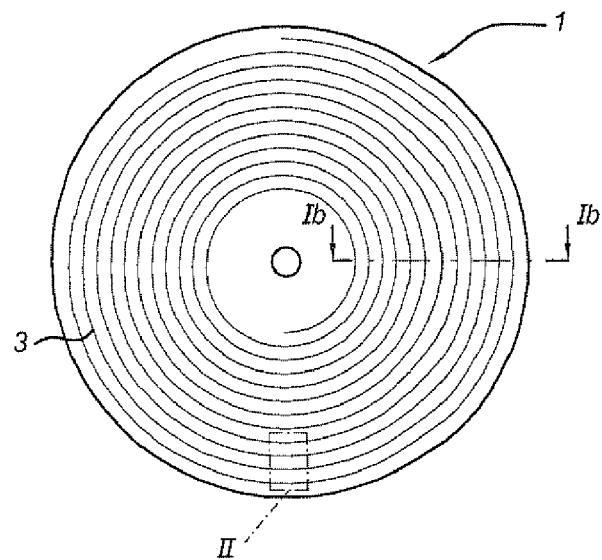
FIG. 1b shows a cross section of an optical disk with one recording layer.
FIG. 1c shows a cross section of an optical disk with two recording layers.
Figure 1B:
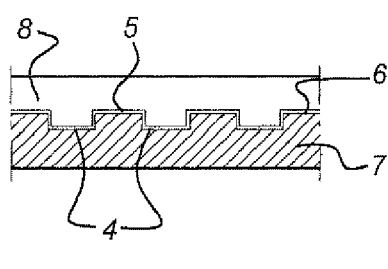
Figure 1C:
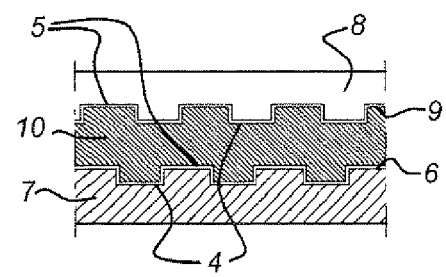

FIG. 1a-c show an optical disk 1 and FIG. 2 shows a detailed view of area 11 of the optical disk 1. The optical disk has a substantially circular, spiraling track 3. The track 3 is a groove 4 in a surrounding surface area 5, also called land. A recording layer 6 is deposited on the substrate 7. The recording layer is covered with a transparent cover layer 8. In a Blu-Ray disk (BD), the transparent cover layer has a nominal thickness of 0.100 mm, and access of the tracks is done through this transparent cover layer. In a DVD disk or a HD-DVD disk, access is done through the substrate 7, which has a thickness of 0.6 mm. In a CD disk, access is done through the substrate 7, which has a thickness of 1.1-1.2 mm.

A Blu-Ray disk may alternatively comprise a flat substrate 7, with the track 3 being replicated in or on the cover layer 8 and the recording layer 6 being deposited on the cover layer 8. The cover layer 8 can, e.g., be a foil sheet, which is glued to the substrate 7.

The optical disk 1 may have a single recording layer 6 as shown in FIG. 1b. The optical disk 1 may also have multiple recording layers 6, 9, separated by a transparent spacer layer 10 as shown in FIG. 1c. In a Blu-Ray disk with multiple recording layers, the spacer layer 10 usually has a thickness in the range of 0.020 mm-0.030 mm.

The disk is produced as a disk with empty tracks 12, as is shown in FIG. 2. The track can accommodate marks 14 which can be written on the track with an optical disk drive. The marks 14 are separated along the track by spaces. The marks can be erased and overwritten in, e.g., a rewritable Blu-Ray disk (BD-RE disk), but can also be of a permanent nature as in a recordable Blu-Ray disk (BD-R disk). The marks and spaces are of various lengths, and carry data information. These marks and spaces can be read out with an optical disk drive, as scanning along the track over these marks and spaces results in a modulation of light reflected on the disk, which is detected by the optical disk drive with a sensor.

As shown in FIG. 2, the track 3 may have a sinusoidal deviation from its nominal position into the radial direction R of the disk. This sinusoidal deviation is called the wobble. The wobble can be a fixed-frequency continuous sinusoidal for use as a time reference signal, e.g., to which the disk speed or a signal clock can be related, or a modulated sinusoidal encoding wobble data information, e.g., a frequency-modulated sinusoidal with a modulation around a centre frequency encoding or a phase-modulated sinusoidal with a modulation at a fixed frequency. Various standardized optical disk systems use the wobble for carrying information to classify the disk and the values of various parameters, e.g., the address of a specific location on the disk and write strategy parameter values. Disks according to the DVD+RW, BD-RE and BD-R standards have a phase-modulated wobble at a fixed spatial period measured along the track. Disks according to the DVD-RW standard have a frequency-modulated wobble.

The track 3 may also comprise portions where the continuous groove 4 is preceded or interrupted by a series of embossed pits, so-called header marks (not shown). The header marks may carry information to classify the disk and the values of various parameters, alternatively or additionally to the information in the wobble. Alternatively or additionally, the continuous land portion 5 may also be interrupted by embossed pits (not shown), so-called land pre-pits, as, e.g., in disks according to the DVD-R standard. Alternatively or additionally, embossed pits may also be positioned in between the groove 4 and the land portion 5, as, e.g., in disks according toe the DVD-RAM standard.

FIG. 3 schematically shows embossed marks on an optical disk of a read-only type.

The read-only disk is produced as a disk with a spiraling track 3, of which subsequent turns may be referred to as grooves 120, 130. The spiraling track is formed by a series of marks 140. The marks 140 are separated along the track by spaces 142. The grooves 120, 130 are separated by an area referred to as land. As the land has the same physical level on the substrate 7 as the spaces 142, it is general phrasing to also refer to the spaces 142 in between the marks 140 as land. The marks 140 may be pits in the substrate or elevations on the substrate, and are generally referred to as embossed pits for either situation. The surface of the substrate 6 carrying the pits may be referred to as the information layer.

FIG. 4 schematically shows cross sections of optical disk of the four different disk families, CD, DVD, HDDVD and BD and the associated incident beams and spots.

Figure 4A:
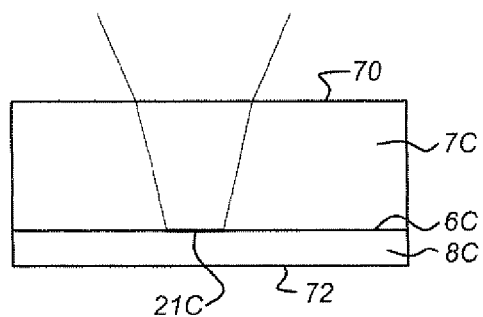

FIG. 4*a* shows a cross section of a CD disk. A recording layer or information layer 6C is embossed in a substrate 7C. The substrate has a thickness of 1.1-1.2 mm. The recording layer 6C is covered with a protective cover layer 8C, which may be covered with a label on its outer surface 72. The infrared incident beam is focused through the substrate on the recording layer 6C with a spot 21C with a NA of 0.40-0.52.

Figure 4B:
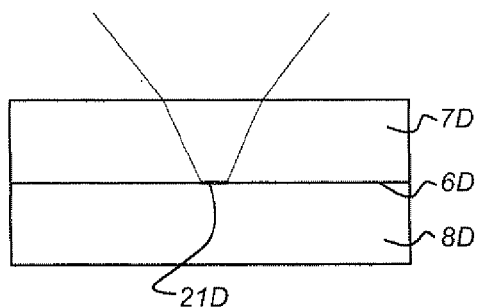

FIG. 4*b* shows a cross section of a DVD disk. A recording layer or information layer 6D is embossed in a substrate 7D. The substrate has a thickness of approximately 0.6 mm. The recording layer 6D is covered with a protective layer 8D, which may be covered with a label. The protective layer 8D may also be another 0.6 mm substrate, either with or without another recording layer back-to-back with recording layer 6D. The red incident beam is focused through the substrate on the recording layer 6D with a spot 21D with a NA of 0.60-0.67.

Figure 4C:
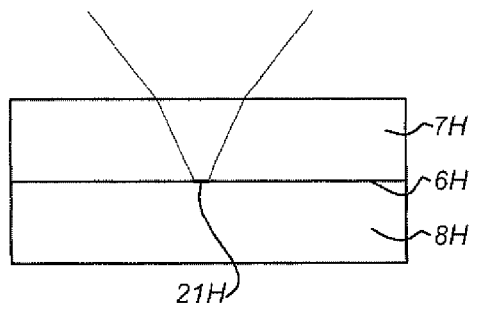

FIG. 4*c* shows a cross section of a HDDVD disk. A recording layer or information layer 6H is embossed in a substrate 7H. The substrate has a thickness of approximately 0.6 mm. The recording layer 6H is covered with a protective layer 8H, which may be covered with a label. The protective layer 8H may also be another 0.6 mm substrate, either with or without another recording layer back-to-back with recording layer 6H. The red incident beam is focused through the substrate on the recording layer 6H with a spot 21H with a NA of 0.67.

Figure 4D:
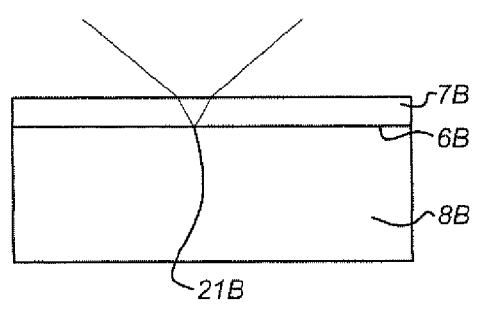

FIG. 4*d* shows a cross section of a BD disk. In the example shown, a recording layer or information layer 6B is embossed in a thin substrate 7B. The thin substrate has a thickness of approximately 0.100 mm. The recording layer 6B is attached to a carrier substrate 8B with a thickness of approximately 1.1 mm. The blue incident beam is focused through the thin substrate 7B on the recording layer 6B with a spot 21B with a NA of 0.80-0.85.

FIG. 5 shows an optical disk drive. The optical disk 1 rotates about an axis 22 operated by a motor 23. An optical source 15, here shown as a laser diode 15, generates an incident optical beam 11, which is directed onto the optical disk via a beam splitter 16, and an objective lens 18. The beam splitter 16 steers the beam over a 90 degree angle. The incident beam 11*a*, is focused by the objective lens 18 into a focussing spot 21 on the track 3. The disk is rotated about the axis 22 by a motor 23 for the spot 21 to scan the tracks along the track. A focus actuator 24 can move the objective lens 18 parallel to its optical axis, i.e., in a direction perpendicular to the disk surface away to or towards the optical disk, to change the depth of the position of the focussing spot 21. A tracking actuator 28 can move the objective lens 18 in the radial direction of the optical disk, to rapidly follow radial excursions of the track when the track 3 is somewhat eccentric to the axis 22. The optical disk drive may further comprise a spherical aberration correction actuator (not shown), capable of applying a correction to the incident beam to compensate for a difference in spherical aberration originating from a substrate thickness (or for BD, cover layer thickness) being different from its nominal value. Likewise, a difference in spherical aberration originating from a spacer layer can also be compensated for when focussing on the different layers of a multi-layer disk. The entire optical system is fitted onto a single support so as to constitute an integrally moveable optical head 38. The movement of the optical head is performed by a head motor 29. A control unit 20 controls the actuators 24, 28 and 29 to keep the optimal position for the objective lens while the disk is rotating. The optical disk reflects the incident beam. The reflected beam 25 is separated from the incident beam by the beam splitter 16 An astigmatic lens (not drawn) may be positioned in the reflected beam to shape the reflected beam 25. The reflected beam is detected by a sensor 26 generating a sensor signal 40. The sensor signal 40 is passed to a pre-processing circuit 27.

FIG. 6 schematically shows an optical source 15 comprising a plurality of laser diodes 15B, 15R, 15I of three different colors. Laser diode 15B generates, during use, a blue beam 11B with a wavelength of approximately 405 nm and is primarily intended for use with HDDVD and BD disks. Laser diode 15R generates, during use, a red beam 11R with a wavelength in the range of 630-690 nm and is primarily intended for use with DVD disks. Laser diode 15I generates, during use, an infrared beam 11I with a wavelength in the range of 780-820 nm and is primarily intended for use with CD disks.

The beams 11B, 11R and 11I are directed with wavelength-sensitive mirrors 15S and 15T to generate the incident beam 11.

This optical source comprises a local laser driver controller SLLDIC, arranged to receive laser driver control signals 33 and to operate the laser diodes 15B, 15R, 15I.

Where a reference is made to a laser diode 15 in this application, the reference may be understood to include optical sources 15 with a plurality of laser diodes as e.g. just described.

As is shown in detail in FIG. 7, the sensor may be a quadruple photodetector 26, having four sensor segments 26A-26D for sensing the intensities of four portions of the reflected beam 25. The sensor signal comprises four channels, A-D, one for each sensor segment. The arrow R represents the relation between the beam portions and the radial direction of the optical disk 1 and the arrow T represents the relation between the beam portions and the tangential direction of the optical disk 1. I.e., sensor 26A and 26B detect intensities corresponding to the inner upper and inner lower quarters respectively of spot 21 as reflected by the optical disk 1, and sensor 26C and 26D detect intensities corresponding to the outer lower and outer upper quarters respectively of spot 21 as reflected by the optical disk 1. The pre-processing unit 27 processes the intensity signals A-D generated by the sensor segments 26A-26D so as to produce a central aperture signal HF=A+B+C+D, a radial tracking error signal or radial push-pull signal PP=(A+B)−(C+D) and, for an astigmatic focussing method, a focus error signal FE=(A+C)−(B+D). The central aperture signal may also be referred to as the data signal. The error signal may be of this form, but may also be normalized, with a normalized radial push-pull signal NPP= ((A+B)−(C+D))/(A+B+C+D) and a normalized focus error signal NFE=((A−B)/(A+B))+((C−D)/(C+D)). Another focussing method may alternatively be used, such as the spot-size method or the Foucault method, with a corresponding focus error signal FE. In the exemplary embodiment of the pre-processing unit 27, the pre-processing unit 27 further comprises a DPD detector circuit 28, capable of producing an alternative radial error signal for radial tracking on a ROM disk when the information layer has embossed marks 140, e.g. with DVD-ROM disks. The DPD detector circuit 28 processes intensity signals A-D so as to produce a so-called Differential Phase Detection signal from a phase difference between the sum signal of signal A and C and the sum signal of signal B and D. This phase difference may be expressed as DPD=phase(A+C)−phase(B+D).

The thickness of the substrate 7C, 7D, 7B, 7H (FIG. 4) through which the information layer 6, 9, 6C, 6D, 6H, 6B is accessed with the incident beam 11 may approximately be determined by monitoring the focus error signal FE and/or the central aperture signal HF together with the drive signal 32 of the focus actuator 24. The drive signal level of the drive signal 24 is a measure of the distance that the objective lens is moved towards or away from the disk. When the objective lens 18 is moved from a distant position towards the disk by varying the drive signal level, the error signal FE and/or the central aperture signal HF may show the presence of the interface 70 between air and the substrate 7C, 7D, 7H, 7B, then the interface between the substrate 7 and the information layer 6, 6C, 6D, 6H, 6B. When the disk is a two-layer disk, another information layer 9 is also detected. As each different substrate thickness, i.e., each different depth of the information layer, is associated with a specific drive signal level, the substrate thickness may be estimated from the drive signal level at which the presence of the information layer 6, 9 is detected. The thickness of the substrate 7 may be used in determining the disk type, as it discriminates between the 1.2 mm disk types (CD), the 0.6 mm disk types (DVD and HDDVD) and the 0.1 mm disk types (BD).

FIG. 8 shows a control unit CON of the optical disk drive. The control unit CON may include one or several microprocessors or digital signal processors. The control unit CON is responsible for several control tasks. The tasks can be executed in the control unit itself, or in an external processor cooperating with the control unit.

The radial push-pull signal PP (or NPP) may be passed to a radial tracking controller RAD. For tracking a ROM disk, the DPD signal DPD may be passed to a radial tracking controller RAD. Arrows 31a and 31b denote the capability of the radial tracking controller RAD to control the tracking actuator 28 and the head motor 29, so as to drive the radial position of the objective lens 18 and the optical head 38. For this purpose, the tracking controller RAD controls the tracking actuator 28 such that the tracking error signal, PP or DPD, substantially has a predetermined value, also called tracking offset. This tracking offset is usually zero. The tracking controller RAD may also be equipped to measure a quality of the radial error signal. Measures used commonly in the art include a push-pull signal amplitude, a DPD signal amplitude and a wobble signal amplitude.

The focus error signal FE (or NFE) is passed to a focus controller FOC. Arrow 32 represents the capability of the focus controller FOC to control the focus actuator 24, so as to keep the focussing spot 21 focused at the correct depth in the track 3. For this purpose, the focus controller FOC controls the focus actuator 24 such that the focus error signal has a predetermined value, also called focus offset.

The data signal HF may be passed to a data recovery mechanism HFPR. The data recovery mechanism HFPR retrieves the data as recorded with the marks 14 and spaces 15 on the recordable optical disk 1, or as present as embossed pits 140 and spaces 150 on a ROM disk. The processing of the data signal HF and the further processing of the recovered data will not be further described here.

Arrow 33 denotes the capability of a laser driver controller LDIC to control the laser diode 15, for example to control the intensity of the incident beam 11. The LDIC may be physically located inside the controller CON, but may alternatively be located on the optical head 38 close to the laser diode 15.

Arrow 35 denotes the capability of a disk motor controller MOT to control the motor 23. A speed of the motor 23 may be adjusted, e.g., to scan the optical disk 1 with a well-defined linear speed or a well-defined angular speed.

The radial push-pull signal PP (or NPP) is also passed to a wobble processor WOB. When scanning the track, the amplitude radial push-pull signal PP shows a variation as a function of time as a result of the wobble on the disk. This variation is also commonly referred to as the wobble signal WS. The wobble processor WOB may generate a digital wobble data signal WDAT from the wobble signal WS. The digital wobble data signal WDAT may further be processed by a digital processor SYSCON, in order to retrieve so-called wobble data coded in the wobble. The wobble data may, e.g., comprise the physical address of the location on the disk, standard write strategy information such as laser power and timing parameters for writing marks, disk information such as the disk manufacturer. The use of the wobble data will not be further described here. The wobble processor WOB may also retrieve a frequency corresponding to the spatial frequency of the wobble on the disk 1 from the wobble signal WS. The wobble processor WOB may also be equipped to measure a quality of the wobble signal WS. Measures used commonly in the art include wobble amplitude, wobble signal-to-noise ratio (wSNR), wobble error rate.

The digital processor SYSCON may also provide and monitor information, such as control settings, via control lines SYSHCON, SYSRCON, SYSFCON, SYSLCON, SYSWCON, SYSMCON to and from the data recovery mechanism HFPR, the radial tracking controller RAD, the focus controller FOC, the laser driver controller LDIC, the wobble processor WOB and the disk motor controller MOT. The focus controller FOC may, e.g., receive a focus offset value via control line SYSFCON in order to apply a focus offset to the focus actuator and hence to move the objective lens towards or away from the disk. The digital processor SYSCON may also interface via 79 to external components, e.g., a host computer in which the optical disk drive is mounted.

The control unit CON may be arranged for aiming to scan the track 3 on the optical disk 1 with an optimal quality of the spot 21. For this purpose, the digital processor SYSCON can, e.g., retrieve a measurement value of push-pull signal amplitude from the radial tracking controller RAD, a measurement value of jitter from the data recovery mechanism HFPR, and a measurement value of wobble amplitude from the wobble processor WOB. By comparing a selection of these measurement values as a function of one or more operating parameters of the various controllers, the digital processor SYSCON may generate optimal values for the operating parameters.

The control unit CON may also comprise a memory unit (not drawn) or cooperate with an external memory device (not drawn), to store and retrieve e.g. control settings, measurement values, values for the operating parameters, one or more tables comprising information related to disk classes, disk types, disk information, write strategies, etc.

FIG. 9 schematically shows an embodiment of a method according to the invention. The method may be implemented in control unit CON or in another controller cooperating with the control unit CON.

Figure 10:
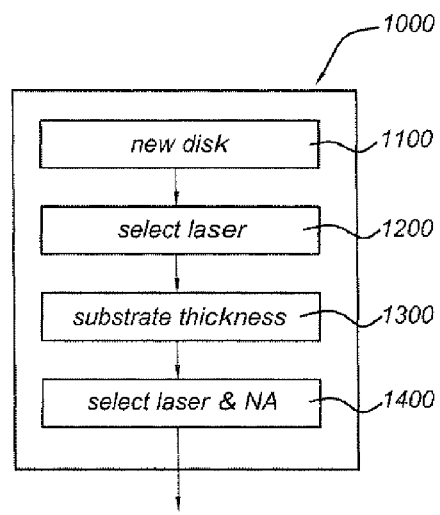

The method initializes in block 1000, of which an exemplary embodiment is shown in FIG. 10. Initializing may e.g. be triggered upon the startup of the disk drive after a power-up or after standby. Initializing may e.g. be triggered by the insertion 1100 of a new optical disk in the optical disk drive. A laser 15B, 15R, 15I is selected 1200, e.g. The red laser 15R, and a substrate thickness measurement 1300 may be performed as described above. Another laser may be selected 1400 in dependence on the substrate thickness measurement, e.g. when the substrate thickness is measured to be approximately 0.100 mm, the blue laser 15B may be selected. When the substrate thickness is measured to be approximately 0.6 mm, the red laser 15R or the blue laser 15B may be selected, as both lasers are suitable for determining a disk type on disks with 0.6 mm substrate thickness. The method may be arranged such as to select the laser color that was used in an disk drive operation that was last used before the current operation, as it is likely that a similar disk type is inserted again, or the same disk is still in the drive. The method may alternatively be arranged to always perform the disk recognition with either the red or the blue laser. In the following examples, the blue laser 15B will be selected unless stated otherwise. Also a numerical aperture is selected. E.g., the numerical aperture associated with the selected wavelength may be chosen, or, when multiple NA's are associated with the selected wavelength, any of the NA's, preferably the largest NA. The NA may also be selected in dependence on the detected substrate thickness. Optionally, when the optical disk drive comprises a spherical aberration correction element, the spherical aberration correction element may be set 1500 to apply a spherical aberration correction, e.g. in accordance to the detected substrate thickness.

After initialization 1000, the incident beam is focused 2000 on the information layer. Also the spherical aberration correction element, when present, may be further adjusted, e.g., in case of a multi-layer disk, in dependence on a layer number of the information layer that the incident beam is focused on. The spherical aberration correction element, when present, may be further adjusted to increase signal quality, e.g. to obtain a maximum amplitude of the radial error signal PP.

In block 3000, the radial error signal PP is analysed for the presence of a wobble signal WS. If so, the method continues with block 4000; if not, the method continues with block 5000 The wobble signal is said to be present when the radial error signal PP is seen to carry a non-negligible component compatible with a signal generated from a wobbled track. Upon detection of the presence of the wobble signal, a pre-identification 4000 is performed to check whether the wobble signal is consistent with the wobbled track according to one of a list of know disk types, e.g. a CD-R, CD-RW, DVD-R, DVD-RW, DVD+R, DVD+RW, DVD-RAM, HDDVD-R, HDDVD-RW, HDDVD-RAM, BD-R or BD-RE. When the wobble is consistent with any of the disk types in the list, the disk is pre-classified as a recordable disk in 4100 (recordable here used as the general term including one-time writable, re-recordable and rewritable) and the method proceeds with block 4200. When the wobble is not consistent with any of the disk types, the method continues from block 4100 to block 5000.

In block 5000, the radial error signal PP and/or the central aperture signal HF and/or other components of the sensor output signal 40 are analysed for a characteristic of a ROM disk. E.g., the central aperture signal HF may be analyzed for the presence of a data signal: as the disk was not identified to be one of the recordable types, the presence of a data signal is a strong indication for the disk being of a read-only type. Alternatively, a differential phase detection signal (DPD signal) may be derived from the sensor output signal 40. The presence of a DPD signal is indicative for the presence of data and may thus also indicate the presence of embossed pits on a read-only disk. When block 5000 identifies the presence of a ROM signal, the method continues with block 6000; when not, the method is ended in block 7000 while classifying the disk as being of an unknown type. When further characteristics may be determined or have been determined during the process, e.g. as part of the initialization 1000, the method may alternatively declare the disk to be of a non-supported type, e.g. when a very clear wobble signal unambiguously indicated the disk to be of a recordable type, but the specific recordable type is not supported by the drive (e.g. because the specific wobble frequency was not known).

Upon entering block 4200, the disk is identified to be a type in one of the groups of a) CD-R and CD-RW type; b) DVD-R and DVD-RW type; c) DVD-R-Qflix type; d) DVD+R and DVD+RW type; e) DVD-RAM type; f) HDDVD-R, HDDVD-RW and HDDVD-RAM type or g) BD-R and BD-RE. As within each group, the wobble frequency is the same between the different disk types in the group and the disk types are very related, the disk type is sufficiently well known to be able to set required read channel parameters in block 4210 (referring to FIG. 14), close the radial tracking loop 4220, and read 4230 disk information data from the disk while tracking the track with the radial error loop closed. The disk information data comprises detailed information on the disk such as a disk type identifier. The disk type may then be used to conclude on the individual disk type, e.g. to conclude that the disk is a DVD+RW disk and not a DVD-R disk. The disk type identifier may also be used to confirm the disk type detection from the wobble frequency alone, e.g. to confirm that the disk was indeed of the DVD-R-Qflix type and not of another but similar type. When the disk type identifier is not found or not recognized by the controller in the next block 4300, the method proceeds with block 5000. Else, the method concludes in 4400 with the identified disk type.

Block 6000 comprises a pre-identification classify the assumed read-only disk as one of a list of know disk types, e.g. a CD-ROM, DVD-ROM, HDVD-ROM or BD-ROM disk. When block 6100 concludes the pre-identification not to be successful, the method concludes with block 6200 and declares the disk to be of an unknown or alternatively of a not-supported type. When block 6100 concludes the pre-identification to be successful, the method may proceed to block 6600 and conclude with the disk type from the pre-identification. Alternatively, the method proceeds with block 6300, where read channel parameters are set in block 6310 (referring to FIG. 19), according to the disk type from the pre-identification, close the radial tracking loop 6320, and read 6330 disk information data from the disk while tracking the track with the radial error loop closed. Again, the disk information data comprises detailed information on the disk such as a disk type identifier. The disk type identifier is then to confirm the disk type detection from the pre-identification, e.g. to confirm that the disk was indeed of the DVD-ROM type and not of another but similar type. When the disk type identifier is not found or not recognized by the controller in the next block 6400, the method concludes with block 6500 and declares the disk to be of an unknown or alternatively of a not-supported type. Else, the method concludes in 6600 with the identified disk type, being a specific disk type of the read-only disk types.

FIG. 11a-11e schematically shows exemplary embodiments of the pre-identification 4000 of the recordable disks.

Figure 11A:
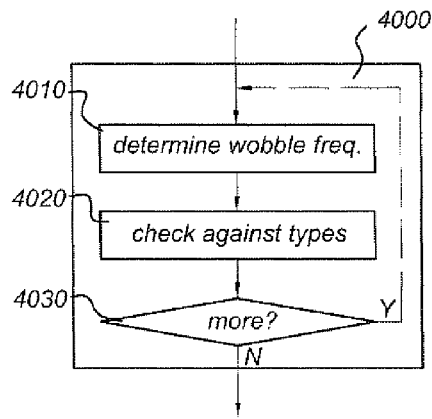

In FIG. 11a, the wobble frequency is determined 4010 from determining a dominant frequency in the wobble signal within a frequency band from a plurality of frequency bands. The dominant frequency is then compared against a list of wobbles frequencies corresponding to respective wobble periods, each of them associated with a disk type of a plurality of disk types as shown in the list below.

|   | Disk Type | Channel bit length | Wobble length | TrackPitch | Wobble period normalized |
|---|---|---|---|---|---|
| 2 | DVD+R | 133 nm | 32× | 740 nm | 1.0 |
| 3 | DVD+RW | | | | |
| 4 | DVD-R | | 186× | | 5.8 |
| 5 | DVD-RW | | | | |
| 6 | DVD-R-QFlix | | 93× | | 2.9 |
| 7 | DVD-RAM | 143 nm | 186× | 1230 nm | 6.2 |
| 9 | HDDVD-R | 102 nm | 93× | 400 nm | 2.2 |
| 10 | HDDVD-RW | | | | |
| 11 | HDDVD-RAM | | | 680 nm | |

When the dominant frequency is compatible with one of the disk types from the list, the block concludes in 4030 with the corresponding disk type or group of disk types. When not, the wobble frequency may determined 4010 from determining a dominant frequency in the wobble signal within another frequency band in a next iteration of this element of the method. Block 4030 may thus iterate until a disk type is recognized or conclude with an unknown (or not-supported) type when no disk type is recognized after testing all frequency bands.

Figure 11B:
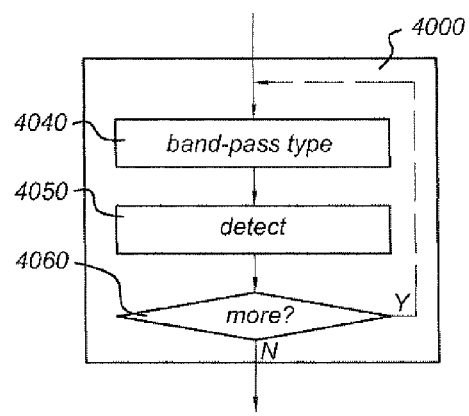

FIG. 11b shows an implementation of the method of FIG. 11a. Block 4040 is an implementation of block 4010, wherein a band-pass filter is applied to the wobble signal, the band-pass filter centered around a frequency corresponding to a wobble frequency of a disk type, which may be an individual disk type or a group of disk types. In block 4050, an implementation of block 4020, the band-passed signal is checked for the presence of a significant amplitude or power. When present, block 4060 concludes with the corresponding disk type. When absent, block 4060 initiates another iteration with another band-pass filter centered around another frequency corresponding to another disk type.

Figure 11C:
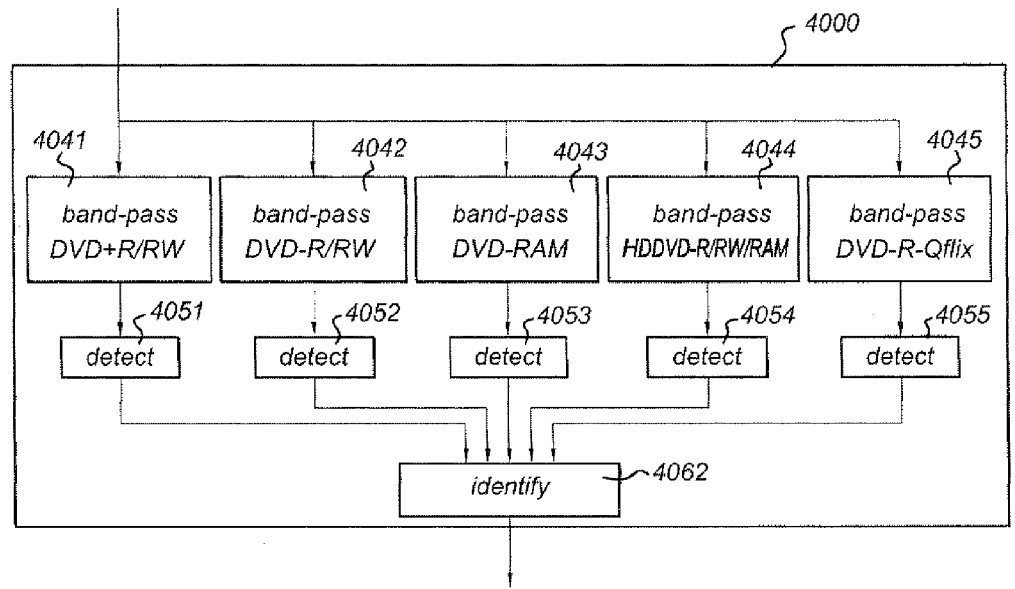

FIG. 11c shows an alternative embodiment of the pre-identification 4000. Five band-pass filters 4041, 4042, 4043, 4044, 4055 are applied in parallel to the wobble signal. The example shown may be applied when the substrate thickness measurement has shown that the disk has a substrate thickness of 0.6 mm, implying that the disk type should be any of the DVD or HDDVD types. The band-pass filters are set to correspond to a) DVD+R and DVD+RW type; b) DVD+R and DVD+RW type; c) DVD-RAM type; d) HDDVD-R, HDDVD-RW and HDDVD-RAM type and e) DVD-R-Qflix type for filter 4041, 4042, 4043, 4044, 4055 respectively. Detection blocks 4051, 4052, 4053, 4054, 4055 check for the presence of a significant amplitude or power in the respective band-pass filtered signals and communicate their results to an identification block 4062. The identification block 4062 then selects the most likely disk type of the five groups of disk types, if any.

Figure 11D:
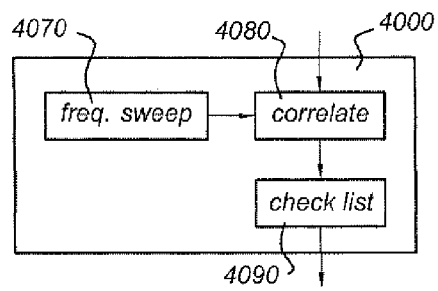

FIG. 11d shows an alternative embodiment of the pre-identification 4000. In stead of applying a plurality of band-pass filters sequentially or in parallel, a correlation 4080 is performed between the wobble signal WS and a sweeping sine, where the sweeping sine is generated in 4070. Once a positive correlation with a momentary frequency of the sweeping sine is detected, block 4090 checks whether the momentary frequency I compatible with any of the wobble frequencies from the list of disk types.

Figure 11E:
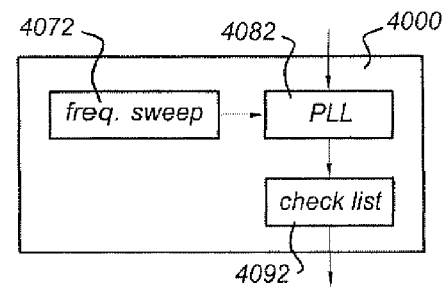

FIG. 11e shows an alternative embodiment of the pre-identification 4000. A frequency selector 4072 selects a frequency or generates a sweeping sine, which is applied as the center frequency to a phase lock loop PLL 4082. The PLL attempts to lock on the wobble signal WS with the applied frequency. Once locking with the applied frequency is successful, block 4092 checks whether the applied frequency I compatible with any of the wobble frequencies from the list of disk types.

FIG. 12a and FIG. 12b schematically shows a radial error signal and a wobble signal.

FIG. 12a shows a trace of the open loop radial push-pull signal 4002, wherein the radial push-pull signal is low-pass filtered to obtain a clean signal for radial tracking.

FIG. 12b shows a trace of the open loop wobble signal 4004, being the superposition of the open loop radial push-pull signal and a composite wobble signal composed of signals generated from at least both sides of a groove when the spot is above a groove or at least both sides of a land when the spot is above a land.

FIG. 12b further shows a trace of a band-pass filtered open loop wobble signal 4006, showing the composite wobble signal composed of signals generated from at least both sides of a groove when the spot is above a groove or at least both sides of a land when the spot is above a land. The composite wobble signal shows a large wobble amplitude when the spot is directly above the center of the grooves or directly above the center of the lands. The composite wobble signal shows a high-frequency oscillation with a period Tw corresponding to the wobble period and a low-frequency envelope variation with a period Te corresponding to a crossing period of the compsite wobble signal while crossing over the tracks in the radial direction R.

The period Tw is thus a direct measure of the wobble frequency.

FIG. 13a and FIG. 13b show an exemplary measurement of a wobble frequency detection and measurement.

FIG. 13a shows measurements for four disk type candidates when checking whether an optical disk is of the DVD+R type. The measurement comprises a band-pass filtering around a center frequency of the open loop wobble signal, i.e. the wobble signal while focusing but before tracking. The center frequency corresponds to the wobble frequency of an optical disk of the DVD+R type. The band pass filter has a width of e.g. +/−20% of the nominal wobble frequency. The horizontal axis corresponds to the frequency content of the filtered signal. The vertical axis shows an amplitude of the resulting band pass filtered signal, but could alternatively show e.g. The power of the resulting band pass filtered signal.

The first curve 4012 shows a measurement on a DVD+R disk. The second curve 4014 shows a measurement on a DVD-ROM disk. The third curve 4016 shows a measurement on a DVD-R-Qflix disk. The fourth curve shows a measurement on a DVD-R disk.

As is clearly observed from the curves, the filtered signal has a strong amplitude when a DVD+R disk is measured, whereas the filtered signal does not show a strong amplitude when a disk of one of the other types is inserted. The measurement may this be used to detect the presence or absence of a wobble signal indicating the track is wobbled or not.

The first curve 4012 may also be used to determine the wobble frequency. E.g., by picking the frequency with the largest amplitude or by fitting a curve to the measurement and taking the maximum of the fit as the wobble frequency.

It will be understood that the series of measurement points along a curve may be obtained by applying narrow band pass filters around a plurality of center frequencies, with a width of 1 unit, and detecting the power (or amplitude) within each narrow band. Hence, in stead of checking whether the wobble signal comprises a frequency corresponding to a specific disk type, e.g. The DVD+R disk type as discussed above, the frequency content of the wobble signal is analyzed using a scanning band pass filter which is sufficiently narrow to discriminate between each of the disk types.

FIG. 13b shows a similar measurement when comparing two Blu-Ray disk types. Curve 4042 shows the frequency content measured on a disk of the BD-R disk type. Curve 4044 shows the frequency content measured on a disk of the BD-ROM disk type. Again, the measurement may be used to detect the presence of a wobble signal and/or to determine the frequency of the wobble signal.

Figure 15A:
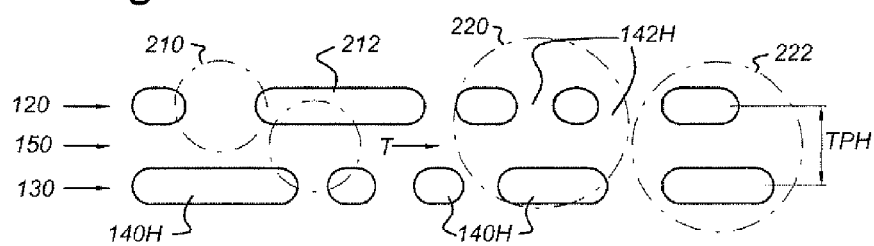

FIG. 15a schematically shows embossed marks 140 on an optical disk of a HDDVD-ROM type. The embossed marks constitute a spiraling track 3 on the optical disk, of which FIG. 15 shows two subsequent turns at a track pitch TPH of 400 nm which will be referred to as grooves 120, 130, and which are separated by a land portion 150. The spaces 142H in between the marks 140H may be referred to as land marks or spaces. The marks 140H and spaces 142H represent data embossed on the optical disk.

A blue spot 210, 212 is focused into a spot 21H on the information layer 6H of the optical disk using a blue laser and an NA of 0.67 with a first spot size. The blue spot is shown as a first blue spot 210 centered on the track 120. The blue spot is shown as a second blue spot 212 centered on the land 150, i.e. in between track 120 and 130. The first spot size is such that it is able to resolve the marks 140H and spaces 142H. However, the first spot size may hardly resolve different turns of the spiraling track at the track pitch TPH in the generated the central aperture signal, as the first red spot 210 centered on the track 120 and the second red blue 212 centered on the land 150 generate approximately the same central aperture signal.

When the radial tracking loop is not closed, the blue spot will not be static above a groove or land portion but cross the grooves and lands. The blue spot will thus generate a central aperture signal 6012H with an approximately constant signal depth 6014H and an approximately constant envelope 6016H, as is shown in FIG. 16. Moreover, low-pass filtering of the central aperture signal 6012H results in filtered signal 6022H with only a small and constant signal depth 6024H.

A red spot 220, 222 is focused into a spot 21D on the information layer 6H of the optical disk using a red laser and an NA of 0.67 with a second spot size. The red spot is shown as a first red spot 220 centered on the track 120. The red spot is shown as a second red spot 222 centered on the land 150, i.e. in between track 120 and 130. The second spot size is such that it is not able to resolve the marks 140H and spaces 142H, nor to resolve different turns of the spiraling track at the track pitch TPH. However, the generated central aperture signal is a bit different between the first red spot 220 centered on the track 120 and the second red spot 222 centered on the land 150.

Figure 15B:
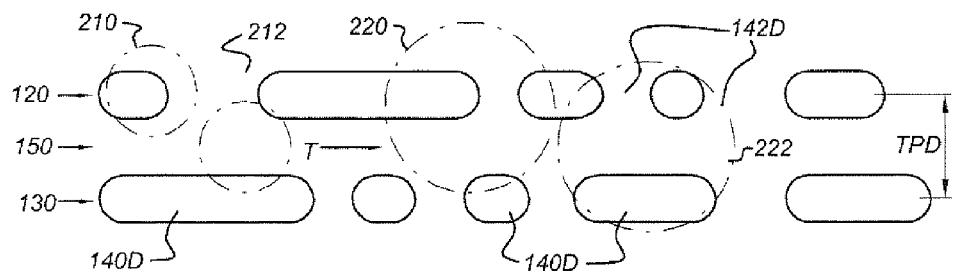

FIG. 15b schematically shows embossed marks 140 on an optical disk of a DVD-ROM type. The embossed marks constitute a spiraling track 3 on the optical disk, of which FIG. 15 shows two subsequent turns at a track pitch TPD which will be referred to as grooves 120, 130, and which are separated by a land portion 150. The track pitch TPD is 740 nm. The spaces 142D in between the marks 140D may be referred to as land marks or spaces. The marks 140D and spaces 142D represent data embossed on the optical disk.

A blue spot 210, 212 is focused into a spot 21H on the information layer 6D of the optical disk using a blue laser and an NA of 0.67 with the first spot size. The blue spot is shown as a first blue spot 210 centered on the track 120. The blue spot is shown as a second blue spot 212 centered on the land 150, i.e. in between track 120 and 130. The first spot size is again such that it is able to resolve the marks 140D and spaces 142D, as well as to resolve different turns of the spiraling track at the track pitch TPD. Moreover, the first blue spot 210 centered on the track 120 will generated a deeply modulated central aperture signal as it fully resolves the marks 140D and spaces 142D, whereas the second blue spot 212 centered on the land 150 will generated only little modulation as the second blue spot falls substantially in between the tracks 120 and 130 such that the marks and spaces generate only a small central aperture signal from the sides of the spot.

When the radial tracking loop is not closed, the blue spot will not be static above a groove or land portion but cross the grooves and lands. The blue spot will thus generate a central aperture signal 6012D with a signal depth varying between a large signal depth 6015D and a smaller signal depth 6014D, and an envelope 6016D with an approximately constant upper level 6016D1 and a varying bottom level 6016D2, as is shown in FIG. 17. Moreover, low-pass filtering of the central aperture signal 6012D results in a filtered signal 6022D with a significant signal depth 6024D.

A red spot 220, 222 is focused into a spot 21D on the information layer 6D of the optical disk using a red laser and an NA of 0.67 with the second spot size. The red spot is shown as a first red spot 220 centered on the track 120. The red spot is shown as a second red spot 222 centered on the land 150, i.e. in between track 120 and 130. Now, the second spot size is such that it is able to resolve the marks 140D and spaces 142D. However, the second spot size may hardly resolve different turns of the spiraling track at the track pitch TPD in generated the central aperture signal, as the first red spot 220 centered on the track 120 and the second red spot 222 centered on the land 150 generate approximately the same central aperture signal.

From FIGS. 16 and 17, the insight was obtained that the central aperture signal shows a different behaviour during open loop radial tracking when focusing on HDDVD-ROM or a DVD-ROM disk. The central aperture signal during open loop radial tracking may also be referred to as track cross signal.

More specifically, the variation of an amplitude of the track cross signal may be used to discriminate between the two disk types.

The amplitude may be the instantaneous track cross signal 6012H, 6012D. The amplitude may be the lower level 6016H2, 6016D2 of the track cross signal 6012H, 6012D. The amplitude may be the envelope 6016D, 6016D of the track cross signal 6012H, 6012D. The amplitude may be the signal depth, varying between 6019H and 6018H for a HDDVD-ROM or between 6019D and 6018D for a DVD-ROM.

The variation may e.g. be expressed as the difference deltaH, deltaD between minimum and maximum signal depth, i.e. deltaH=6019H−6018H and deltaD=6019D−6018D, or as a modulation depth MH, MD, e.g. expressed as MH=(6019H−6018H)/6019H and MD=(6019D−6018D)/6019D.

The variation may e.g. be expressed as the variance of the variation of the amplitude, e.g. The variance of the signal depth, the variance of the envelope 6016H, 6016D the variance of the lower level 6016H2, 6016D2, or the variance of the corresponding low-pass filtered signals.

Alternatively, any other statistical measure expressing the variation of an amplitude of the track cross signal or a corresponding low-pass filtered signal may be used. Discrimination may then be performed between HDDVD-ROM and DVD-ROM by qualifying the disk as a HDDVD-ROM type when the variation of below a pre-determined threshold and as a DVD-ROM type when it is above the pre-determined threshold. When discriminating between more read-only disk types, the discrimination may be performed by qualifying the disk when the variation is in one of a plurality of pre-determined ranges, each range corresponding to another disk type.

The amplitude may be normalized to become e.g. less sensitive to variations in disk reflectivity between different disks or on different locations on a single disk.

Alternatively, as shown in FIG. 18, a first variation may be obtained 6020 from a low-pass filtered amplitude and a second variation may be obtained 6010 from a non-filtered amplitude. Determination 6030 of the ROM type may then be performed in dependence on the first and the second variation. E.g., after normalizing the second variation with the first variation, discrimination may be based on comparing the ratio against a pre-determined ratio threshold.

The method discussed in reference with FIG. 15-18 may be used to discriminate e.g. between DVD-ROM and HDDVD-ROM disk types, and/or between CD-ROM and DVD-ROM disk types, or any other ROM disk types with a different track cross behaviour between the ROM disk types.

The methods described above may be implemented in an optical disk drive, preferably in the processor CON, or system controller SYSCON of the optical disk drive, or in a apparatus cooperating with an optical disk drive and communicating with the processor CON or system controller SYSCON over the interface 79.

In FIG. 20, an overview is given of a computer arrangement that can be used to carry out the method according to the invention. The arrangement comprises a processor 601 for carrying out arithmetic operations.

The processor 601 is connected to a plurality of memory components, including a hard disk 605, Read Only Memory (ROM) 607, Electrically Erasable Programmable Read Only Memory (EEPROM) 609, and Random Access Memory (RAM) 611. Not all of these memory types need necessarily be provided. Moreover, these memory components need not be located physically close to the processor 601 but may be located remote from the processor 601.

The processor 601 is also connected to means for inputting instructions, data etc. by a user, like a keyboard 613, and a mouse 615. Other input means, such as a touch screen, a track ball and/or a voice converter, known to persons skilled in the art may be provided too.

A reading unit 617 connected to the processor 601 is provided. The reading unit 617 is arranged to read data from and possibly write data on a data carrier like a floppy disk 619 or a CD 621. Other data carriers may be tapes, DVD, BD, etc. as is known to persons skilled in the art.

The processor 601 is also connected to a printer 623 for printing output data on paper, as well as to a display 603, for instance, a cathode-ray tube monitor or a LCD (Liquid Crystal Display) screen, or any other type of display known to persons skilled in the art.

The processor 1 may be connected to a communication network 627, for instance, the Public Switched Telephone Network (PSTN), a Local Area Network (LAN), a Wide Area Network (WAN), etc. by means of I/O means 625. The processor 601 may be arranged to communicate with other communication arrangements through the network 627.

The data carrier 619, 621 may comprise a computer program product in the form of data and instructions arranged to provide the processor with the capacity to perform a method in accordance with the invention. However, such computer program product may, alternatively, be downloaded via the telecommunication network 627.

The processor 601 may be implemented as stand alone system, or as a plurality of parallel operating processors each arranged to carry out subtasks of a larger computer program, or as one or more main processors with several sub-processors. Parts of the functionality of the invention may even be carried out by remote processors communicating with processor 601 through the network 627.

It should be noted that the above-mentioned embodiments illustrate rather than limit the invention, and that those skilled in the art will be able to design many alternative embodiments without departing from the scope of the appended claims. E.g., a digital signal may be used where an analogue signal is suggested and vice versa, without departing from the scope of the invention and the appended claims. Also, the invention may be analogously applied for e.g. other disk types and other optical disk drive configurations than those explicitly described in the embodiments above. In the claims, any reference signs and symbols placed between parentheses shall not be construed as limiting the claim.

The invention claimed is:

1. An optical disk drive for determining a disk type of an optical disk comprising a substantially circular track, the optical disk drive comprising:
an optical source for generating an incident beam, an optical arrangement comprising an objective lens for focusing the incident beam into a spot on the optical disk, for positioning the spot at a radial position along the disk and for tracking the track, wherein the disk type of the optical disk at least be either a first disk type or a second disk type, wherein the first disk type is associated with a first disk standard corresponding to a first laser color of the incident beam and a first numerical aperture of the objective lens relating to a first spot size of the spot, the second disk type is associated with a second disk standard corresponding to a second laser color of the incident beam and a second numerical aperture of the objective lens relating to a second spot size of the spot, and the second spot size is different from the first spot size;

a sensor for sensing a reflected beam produced by the optical disk upon receiving the incident beam and for producing a sensor output signal comprising a radial error signal, and a signal analyzer arranged to:
receive the radial error signal while the incident beam is focused onto said optical disk and before tracking the track,
analyze the radial error signal for detecting whether a wobble signal is present, indicating whether the track is wobbled, and
derive a disk type indicator from the wobble signal, if present, indicating whether the optical disk is one of a group of disk types, and wherein, upon detecting the presence of the wobble signal, the signal analyzer is arranged to:
check whether the wobble signal comprises a frequency within a selected frequency range associated with a selected disk type, the selected disk type being selected from the group consisting of the first disk type and the second disk type, and
if the check is positive, classify the optical disk as being of the selected disk type,
if the check is negative, further check whether the wobble signal comprises a frequency within a further frequency range associated with a further disk type, the further disk type being selected from the group consisting of the first disk type and the second disk type, the further disk type being different from the selected disk type, and
if the further check is positive, classify the optical disk as being of the further disk type, and wherein, after classification of the optical disk as being of either the first or the second type, the optical disk drive is arranged to be subsequently operated with:
the optical source generating the incident beam with either the first laser color, upon classification of the optical disk as being of the first type, or the second laser color upon classification of the optical disk as being of the second type, and
the optical arrangement focusing the incident beam into a reading spot on the optical disk, positioning the reading spot at a radial position along the disk and tracking the track with the reading spot.

2. The optical disk drive according claim 1, wherein the check is performed using each frequency range of a plurality of frequency ranges as the selected frequency range until the check is positive or, if no check is positive, until all frequency ranges have been tested,
wherein each of the plurality of frequency ranges is associated with a corresponding disk type from a plurality of disk types, and each of the plurality of frequency ranges being substantially different from the other frequency ranges of the plurality of frequency ranges.

3. The optical disk drive according to claim 1, wherein, to check whether the wobble signal comprises a frequency within the selected frequency range associated with the selected disk type, the signal analyzer is arranged to:
derive a band-passed signal from the wobble signal by applying a band-pass filter associated with the selected frequency range to the wobble signal, and
check the band-passed signal for the presence of a significant amplitude or power.

4. The optical disk drive according to claim 1, wherein, to check whether the wobble signal comprises a frequency within the selected frequency range associated with the selected disk type, the signal analyzer is arranged to:
check whether a phase lock loop locks to the wobble signal at a frequency within the selected frequency range.

5. The optical disk drive according to claim 1, wherein the optical disk drive further comprises a signal decoder arranged to:
receive the sensor output signal at least after the deriving of the disk type indicator and while the optical arrangement is focusing the incident beam into a reading spot on the optical disk, positioning the reading spot at a radial position along the disk and tracking the track with the reading spot, wherein the radial position along the disk comprises disk information data, the disk information data comprising at least a disk type identifier,
retrieve the disk type identifier from the sensor output signal, and
deriving the disk type from the disk type indicator and the disk type identifier.

6. The optical disk drive according to claim 1, wherein the second spot size is larger than the first spot size.

7. The optical disk drive according to claim 1, wherein: the sensor output signal further comprises
a central aperture signal with a signal amplitude, and
the optical disk drive further comprises a HF signal analyzer arranged to, at least when the optical disk is not classified as being one in a pre-determined group of disk types:
receive the central aperture signal from the sensor while the incident beam is focused onto the optical disk and before tracking the track,
analyze the signal amplitude of the central aperture signal, and
determine the disk type from at least a first variation of the signal amplitude of the central aperture signal as a function of time.

8. An optical disk drive for determining a disk type of an optical disk comprising a substantially circular track comprising a sequence of marks and a land portion separating adjacent parts of the track spaced at a track pitch, the optical disk drive comprising:
an optical source for generating an incident beam,
an optical arrangement for focusing the incident beam onto the optical disk into a spot with a spot size, for positioning the spot at a radial position along the disk and for tracking the track,
a sensor for sensing a reflected beam produced by the optical disk upon receiving the incident beam, and for producing a sensor output signal comprising a central aperture signal with a signal amplitude,
a HF signal analyzer arranged to:
receive the central aperture signal from the sensor while the incident beam is focused onto the optical disk and before tracking the track, analyze the signal amplitude of the central aperture signal determine a filtered signal from low-pass filtering the signal amplitude of the central aperture signal as a function of time, the filtered signal having a filtered signal amplitude, determine a first variation from the filtered signal as a function of time, determine a second variation of the signal amplitude from the central aperture signal as a function of time before low-pass filtering the signal amplitude of the central aperture signal, and determine the disk type from the first variation and the second variation.

9. The optical disk drive according to claim 8, wherein the optical arrangement comprises an objective lens for focusing the incident beam onto the optical disk, and wherein the disk type is selected from a first ROM disk type and a second ROM disk type, the first ROM disk type being associated with a first disk standard corresponding to a first laser color of the incident beam and a first numerical aperture of the objective lens relating to a first spot size and a first track pitch, the second ROM disk type being associated with a second disk standard corresponding to a second laser color of the incident beam and a second numerical aperture of the objective lens relating to a second spot size and a second track pitch, the second spot size being different from the first spot size and the second track pitch being different from the first track pitch, and wherein the HF signal analyzer is arranged to receive the central aperture signal from the sensor while the incident beam is focused onto the optical disk with the second laser color and the second numerical aperture for determining the disk type.

10. The optical disk drive according to claim 9, wherein the second spot size is smaller than the first spot size and the second track pitch is smaller than the first track pitch.

11. The optical disk drive according to claim 9, wherein, after determining the disk type as being of either the first ROM disk type or the second ROM disk type, the optical disk drive is arranged to be subsequently operated with:

the optical source generating the incident beam with either the first laser color upon determining the optical disk as being of the first ROM disk type, or the second laser color upon determining the optical disk as being of the second ROM disk type, and the optical arrangement focusing the incident beam into a reading spot on the optical disk, positioning the reading spot at a radial position along the disk and tracking the track with the reading spot.

12. A method for determining a disk type of an optical disk comprising a substantially circular track, wherein the method comprises steps of:

receiving a radial error signal while an incident beam is focused onto the optical disk and before tracking the track;

analyzing the radial error signal for detecting whether a wobble signal is present, indicating whether the track is wobbled; and deriving a disk type indicator from the wobble signal, if present, indicating whether the optical disk is one of a group of disk types, wherein, upon detecting the presence of the wobble signal, the method further comprises steps of:

checking whether the wobble signal comprises a frequency within a selected frequency range associated with a selected disk type, the selected disk type being selected from the group consisting of the first disk type and the second disk type;

if the check is positive, classifying the optical disk as being of the selected disk type;

if the check is negative, further checking whether the wobble signal comprises a frequency within a further frequency range associated with a further disk type, wherein the further disk type is selected from the group consisting of the first disk type and the second disk type, and the further disk type is different from the selected disk type; and if the further check is positive, classifying the optical disk as being of the further disk type.

13. A method for determining a disk type of an optical disk comprising a substantially circular track, wherein the method comprises steps of:

receiving a central aperture signal while a incident beam is focused onto the optical disk and before tracking the track;

analyzing a signal amplitude of the central aperture signal;

determining a filtered signal from low-pass filtering the signal amplitude of the central aperture signal as a function of time, wherein the filtered signal having a filtered signal amplitude;

determining a first variation from the filtered signal as a function of time;

determining a second variation of the signal amplitude from the central aperture signal as a function of time before low-pass filtering the signal amplitude of the central aperture signal; and determining the disk type from the first variation and the second variation.

* * * * *